(12) United States Patent
Yuasa et al.

(10) Patent No.: US 6,636,953 B2
(45) Date of Patent: Oct. 21, 2003

(54) RECEIVING APPARATUS THAT RECEIVES AND ACCUMULATES BROADCAST CONTENTS AND MAKES CONTENTS AVAILABLE ACCORDING TO USER REQUESTS

(75) Inventors: Aki Yuasa, Nagoya (JP); Hideyuki Takeda, Nagoya (JP); Ken Noda, Watari-machi (JP); Hiroyuki Iitsuka, Katano (JP)

(73) Assignee: Matsushita Electric Co., Ltd., Osaka fu (JP)

( * ) Notice: Subject to any disclaimer, the term of this patent is extended or adjusted under 35 U.S.C. 154(b) by 186 days.

(21) Appl. No.: 09/867,117

(22) Filed: May 29, 2001

(65) Prior Publication Data

US 2002/0184457 A1 Dec. 5, 2002

(30) Foreign Application Priority Data

May 31, 2000 (JP) ........................................ 2000-162762

(51) Int. Cl.[7] ............................................. G06F 12/00
(52) U.S. Cl. ........................ 711/161; 711/162; 707/204
(58) Field of Search ................................. 711/161–162; 714/6; 707/204

(56) References Cited

U.S. PATENT DOCUMENTS

| 5,673,381 | A | * | 9/1997 | Huai et al. ........................ 714/1 |
| 5,953,729 | A | * | 9/1999 | Cabrera et al. ............... 707/204 |
| 6,131,148 | A | * | 10/2000 | West et al. ................... 711/162 |
| 6,202,124 | B1 | * | 3/2001 | Kern et al. ................... 711/112 |
| 6,434,680 | B2 | * | 8/2002 | Belknap et al. .............. 711/161 |

FOREIGN PATENT DOCUMENTS

JP 11127396 5/1999

* cited by examiner

Primary Examiner—Nasser Moazzami

(57) ABSTRACT

A receiving apparatus that sequentially receives and accumulates a plurality of broadcast contents into a storage medium deletes each content accumulated in the storage medium after a predetermined time period as the capacity of the storage medium is limited. The receiving apparatus is connected to at least one external device, and accepts a user designation of a content to be stored and of an external device into which the content is to be stored. The receiving apparatus schedules the transfer of the content in the available time period of the external device, and transfers the content to the external device if the device is not busy at the scheduled time.

21 Claims, 28 Drawing Sheets

FIG. 4

CONTENT MANAGEMENT INFORMATION 2000

| CONTENT NAME | DATE AND TIME | TYPE | GENRE | AMOUNT | EXPIRY DATE | STORAGE TARGET | STORAGE STATE | STORAGE COMPLETION NOTICE |
|---|---|---|---|---|---|---|---|---|
| ... | ... | ... | ... | ... | ... | ... | ... | ... |
| MOVIE 1 | 6/1 10:00 | AUDIO AND VIDEO | MOVIE | 3:00 | 6/8 | D-VHS(1) | NOT STORED | NECESSARY |
| SPORTS 2 | 6/1 14:00 | AUDIO AND VIDEO | SPORTS | 1:30 | 6/8 | D-VHS(2) | NOT STORED | UNNECESSARY |
| MUSIC 1 | 6/1 19:00 | AUDIO | MUSIC | 1:00 | 6/8 | MD | STORED | GIVEN |
| MUSIC 2 | 6/1 21:00 | AUDIO | MUSIC | 0:30 | 6/8 | NONE | — | — |
| NEWS 6/2 | 6/2 0:00 | STILL IMAGE | NEWSPAPER | 2MB | 6/9 | PC | STORED | GIVEN |
| ... | ... | ... | ... | ... | ... | ... | ... | ... |

FIG. 5

DEVICE MANAGEMENT INFORMATION 2100

| DEVICE NAME (2101) | DEVICE INFORMATION (2102) | STATE (2103) | STORAGE SCHEDULE INFORMATION (2104) |
|---|---|---|---|
| D-VHS(1) | AUDIO AND VIDEO STORABLE AVAILABLE COMMAND (XX,...) FREE SPACE ... | AVAILABLE | MOVIE 51, 6/3 10:00~6/3 10:50<br>MOVIE 1, 6/3 10:50~6/3 12:05<br>MOVIE 53, 6/3 13:00~6/3 14:00 |
| D-VHS(2) | AUDIO AND VIDEO STORABLE AVAILABLE COMMAND (XX,...) FREE SPACE ... | BUSY | SPORTS 2, 6/3 11:00~6/3 11:33 |
| MD | AUDIO STORABLE AVAILABLE COMMAND (XX,...) FREE SPACE ... | AVAILABLE | |
| PC | STILL IMAGE STORABLE FREE SPACE ... | AVAILABLE | |
| ... | ... | ... | ... |

FIG. 10

| CONTENT NAME | DATE AND TIME | TYPE | GENRE | AMOUNT | EXPIRY DATE | STORAGE TARGET | STORAGE STATE |
|---|---|---|---|---|---|---|---|
| MOVIE 51 | 5/30 7:00 | AUDIO AND VIDEO | MOVIE | 2:00 | 6/6 | D-VHS(1) | PARTIALLY STORED |
| MOVIE 1 | 6/1 10:00 | AUDIO AND VIDEO | MOVIE | 3:00 | 6/8 | D-VHS(1) | NOT STORED |
| SPORTS 2 | 6/1 14:00 | AUDIO AND VIDEO | SPORTS | 1:30 | 6/8 | D-VHS(2) | NOT STORED |
| MUSIC 7 | 6/2 13:00 | AUDIO | MUSIC | 0:30 | 6/9 | MD | NOT STORED |

PLEASE SELECT CONTENT YOU DESIRE TO CANCEL STORAGE SCHEDULE

DATA STRUCTURE OF ELEMENT
IN STORAGE CONTENT LIST

FIG. 19

STORAGE TARGET DEVICE DETERMINING INFORMATION 7100 / 7101 / 7102

| CONTENT TYPE | DEVICE NAME (IN PRIORITY ORDER) |
|---|---|
| AUDIO AND VIDEO | D-VHS(1), D-VHS(2), AV-HDD |
| AUDIO | AV-HDD, HDD |
| ⋮ | ⋮ |

| CONTENT NAME | DATE AND TIME | TYPE | GENRE | AMOUNT | EXPIRY DATE |
|---|---|---|---|---|---|
| MOVIE 1 | 6/1 10:00 | AUDIO AND VIDEO | MOVIE | 3:00 | 6/8 |
| SPORTS 2 | 6/1 14:00 | AUDIO AND VIDEO | SPORTS | 1:30 | 6/8 |
| MUSIC 1 | 6/1 19:00 | AUDIO | MUSIC | 1:00 | 6/8 |
| MUSIC 2 | 6/1 21:00 | AUDIO | MUSIC | 0:30 | 6/8 |

PLEASE SELECT CONTENT YOU DESIRE TO STORE

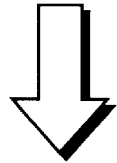

3002

● NOTICE REQUESTED   ○ NOTICE NOT REQUESTED

PLEASE SELECT STORAGE COMPLETION NOTICE REQUEST

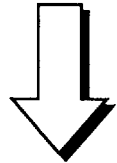

7301

AUDIO AND VIDEO CONTENT "SPORTS2" WILL BE STORED IN "D-VHS(2)"

[ OK ]   [ CHANGE STORAGE TARGET ]

FIG. 24

7500 GENRE CLASSIFIED STORAGE TARGET DEVICE DETERMINING INFORMATION

| GENRE | DEVICE NAME (IN PRIORITY ORDER) |
|---|---|
| MOVIE | D-VHS(1) , AV-HDD |
| SPORTS | D-VHS(2) , AV-HDD |
| NEWS | D-VHS(3) , AV-HDD |
| MUSIC | MD |
| ⋮ | ⋮ |

7501  7502

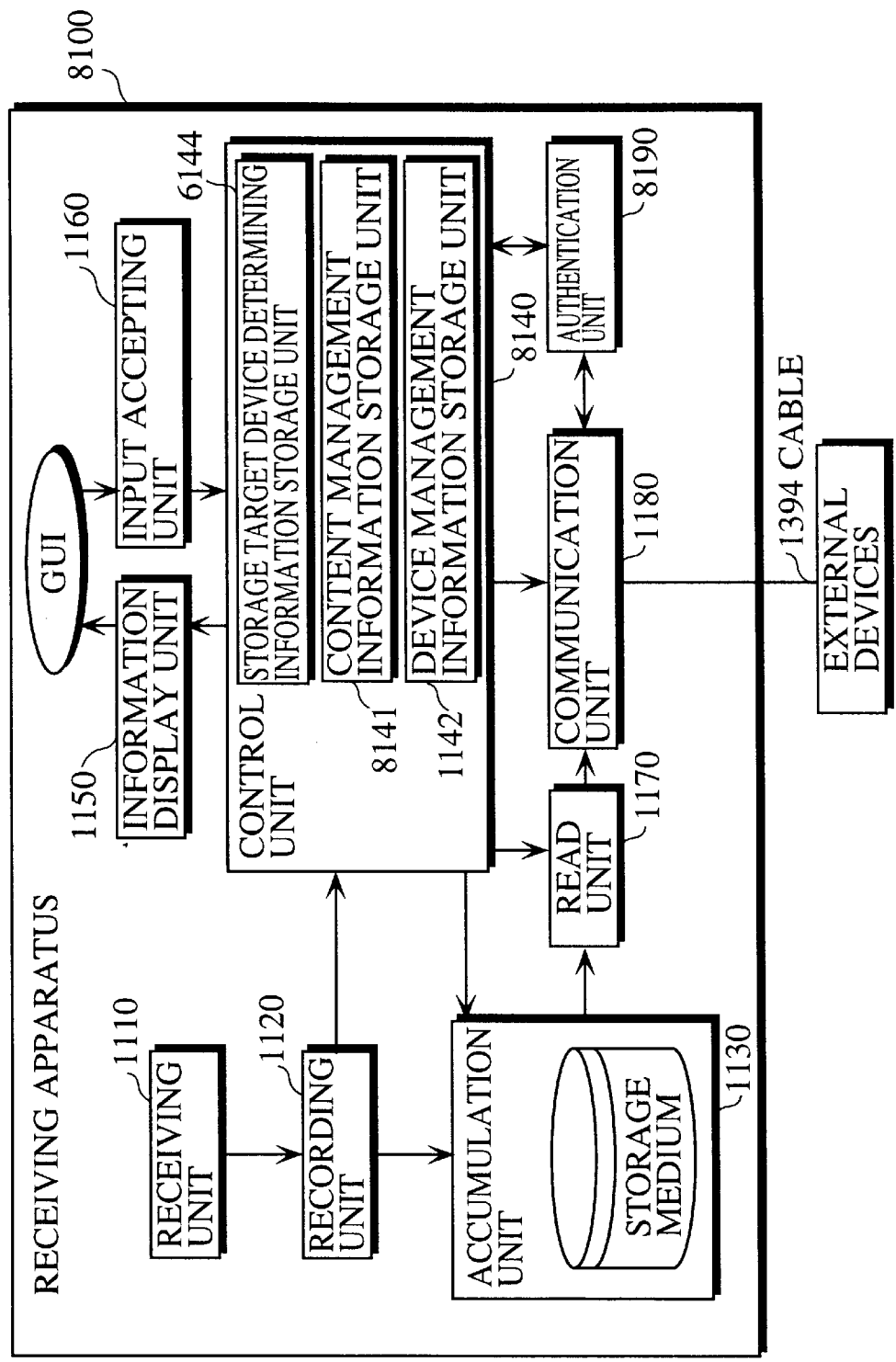

FIG. 26

CONTENT MANAGEMENT INFORMATION 8300

| CONTENT NAME (2001) | DATE AND TIME (2002) | ... | TYPE (2003) | GENRE (2004) | ... | STORAGE COMPLETION NOTICE (2009) | COPY RESTRICTIVE INFORMATION (8310) |
|---|---|---|---|---|---|---|---|
| MOVIE 1 | 6/1 10:00 | | AUDIO AND VIDEO | MOVIE | | NECESSARY | TRANSFER ONLY |
| SPORTS 2 | 6/1 14:00 | | AUDIO AND VIDEO | SPORTS | | UNNECESSARY | NO RESTRICTION |
| MUSIC 1 | 6/1 19:00 | | AUDIO | MUSIC | | GIVEN | DO NOT COPY |
| MUSIC 2 | 6/1 21:00 | | AUDIO | MUSIC | | — | ONE-COPY ONLY |
| NEWS 6/2 | 6/2 0:00 | | STILL IMAGE | NEWSPAPER | | GIVEN | NO RESTRICTION |
| ... | ... | | ... | ... | | ... | ... |

FIG. 28

DEVICE INFORMATION TABLE

| DEVICE TYPE | STORABLE CONTENT TYPE |
|---|---|
| D-VHS | AUDIO AND VIDEO (AV STREAM) |
| AV-HDD | AUDIO AND VIDEO (AV STREAM), MPEG, STILL IMAGE (JPEG), ... |
| PC | AUDIO AND VIDEO (AV STREAM), STILL IMAGE (JPEG), MUSIC (WAV), MP3,... |
| MD | MUSIC (WAV), MD FORMAT |
| ⋮ | ⋮ |

RECEIVING APPARATUS THAT RECEIVES AND ACCUMULATES BROADCAST CONTENTS AND MAKES CONTENTS AVAILABLE ACCORDING TO USER REQUESTS

BACKGROUND OF THE INVENTION (1) Field of the Invention

The present invention relates to a receiving apparatus that receives and accumulates broadcast contents in a storage medium such as a hard disc, and in particular relates to techniques for storing the contents accumulated in the storage medium into other devices so that the contents are available to users for a long period of time.

(2) Related Art

With the development of telecommunication techniques and multimedia-related techniques, active research and development of data accumulation-type broadcast systems have been made in recent years.

An accumulation-type broadcast system is mainly composed of a broadcasting apparatus and a receiving apparatus. The broadcasting apparatus broadcasts various contents, such as television programs, music, movies, games, and newspapers, and the receiving apparatus receives and accumulates the broadcast contents in a storage medium such as a large-capacity hard disc, so that the contents can be displayed or reproduced when requested by the user. Here, it is assumed that the contents broadcasted by the broadcasting apparatus are received by a number of receiving apparatuses each located distant from the broadcasting apparatus.

In such an accumulation-type broadcast system, a date and time when the user can start access to each content is basically determined beforehand. The broadcasting apparatus broadcasts each content before its determined data and time, so that the receiving apparatuses can receive and accumulate the content. Also, it is assumed that each receiving apparatus is installed in a house or the like and is connected to a television monitor, a video recording/reproducing device, an audio device, a personal computer, and the like, for displaying or reproducing the accumulated content. Here, the content is generally broadcasted after being compressed according to the MPEG (Moving Picture Coding Expert Group) standards or the like, depending on the type of the content. The receiving apparatus accumulates the compressed content in the storage medium, and decompresses the content when displaying or reproducing it.

The receiving apparatus successively receives contents designated by the user individually or according to channel or genre, and accumulates them into the storage medium, when the contents are broadcasted. However, as the capacity of the storage medium is finite, the amount of contents that can be accumulated is limited.

This makes it necessary to provide the receiving apparatus with a structure for deleting the accumulated contents based on a certain method, to secure a storage area for new contents. This deletion includes elimination of the accumulated contents by writing new contents into areas where the contents are recorded.

Accordingly, the receiving apparatus has the function of receiving contents and temporarily storing the received contents in the storage medium to provide them for the user.

This means that the user can utilize contents accumulated in the receiving apparatus only for a limited time period from when the contents are accumulated into the storage medium to when the contents are deleted from the storage medium.

Suppose a newspaper is broadcasted by the broadcasting apparatus every day and the receiving apparatus writes a newly received newspaper over a newspaper received and accumulated on the previous day. In such a case, the user cannot read the newspaper of the previous day once he or she receives the new newspaper.

Also, suppose the receiving apparatus successively receives and accumulates all contents broadcasted on one channel, based on a user indication including a channel designation, and that the receiving apparatus deletes, when a free space in the storage medium becomes insufficient, a content that has been accumulated for no less than one week since the content becomes available. In such a case, the user can utilize a content any time for at least one week. When one week passes, however, the user may not be able to utilize the content.

The above described disadvantage that the finite capacity of the storage medium limits the time period for the user to utilize the contents occurs not only in the receiving apparatuses in accumulation-type broadcast systems but also in any receiving apparatuses that have the functions of receiving and temporarily storing the contents to provide them for the user.

However, the user may want to utilize some contents substantially long after the contents are received and accumulated by the receiving apparatus.

SUMMARY OF THE INVENTION

In response to the above described user demand, the present invention has its principal object the provision of a receiving apparatus that receives broadcast contents and accumulates the contents in a storage medium, and stores the accumulated contents into other devices to make them available to the user for a long period of time. Another important object of the present invention is to provide a content storage method for use in the receiving apparatus and a control program that instructs to execute the content storage method.

The above object can be achieved by a receiving apparatus that receives and accumulates broadcast contents into a storage medium to make each content available to a user, comprising: a receiving/accumulating unit for receiving and accumulating the contents into a first storage medium; a deleting unit for deleting each content accumulated in the first storage medium; a designation accepting unit for accepting a designation of a content from the user; a transfer arranging unit for (a) judging whether transfer of the designated content from the first storage medium to a second storage medium before deletion of the designated content is possible, and (b) arranging the transfer of the designated content when judging that the transfer is possible; and a transferring unit for transferring the designated content from the first storage medium to the second storage medium before the designated content is deleted, as arranged by the transfer arranging unit.

Here, deleting includes deleting a part of the content, or eventually eliminating the content by writing a new content over the content.

According to this construction, the contents accumulated in the first storage will be deleted some time as the capacity of the first storage medium into which contents are successively received and accumulated is limited. With a simple user designation of a content desired to be stored, however, the content is checked whether it can be transferred to another storage medium before deleted. When such transfer is possible, the transfer of the content is arranged and performed later. This enables the user to utilize the content any time even after it is deleted from the first storage medium.

Here, the second storage medium may be included in an external device that is connected to the receiving apparatus and that can be used by the user, the receiving apparatus may further comprise: the first storage medium; and a device information obtaining unit for obtaining device state information from the external device, the device state information showing whether the external device is in a content-storable state, the content-storable state at least including a state where the external device is not being used by the user, and the transfer ring unit transfers the designated content from the first storage medium to the second storage medium included in the external device, when the device state information shows that the external device is in the content-storable state.

According to this construction, the content is transferred to the external device while the user is not using the external device, such as a D-VHS, connected to the receiving apparatus via the 1394 cable or the like. Namely, the content is transferred, effectively using an available time period of the external device. As a result of this, the user can utilize the content any time.

Also, the receiving apparatus may further comprise an interruption accepting unit for accepting an interruption indication from the external device, the interruption indication showing that the transfer of the designated content is to be suspended, wherein when the interruption accepting unit accepts the interruption indication, the transferring unit suspends the transfer, and resumes the transfer once the external device is back in the content-storable state.

According to this construction, in case the user uses the external device of the storage target during storage of the content, the storage of the content is performed later. Due to this, the content can be stored without burdening the user with another operation to indicate the storage of the content.

Here, the transfer arranging unit schedules the transfer of the designated content by setting a time when the designated content is to be transferred, in such a manner that the time does not overlap any time set for a content of a preceding designation accepted by the designation accepting unit, and the transferring unit transfers the designated content at the time set by the transfer arranging unit.

According to this construction, even when a plurality of contents are designated to be stored by the user, the transfer time of each content does not interfere.

Here, the time set by the transfer arranging unit is a start time and an end time of the transfer, the transfer arranging unit (a) sets the time so that the designated content can be transferred, based on a data amount of the designated content, and (b) divides the content into a plurality of parts and sets a start time and an end time of transfer of each part, when unable to set the time without overlapping the time set for the content of the preceding designation, and the transfer unit transfers each part during a time period between the start time and the end time set for the part.

According to this construction, even when the external device does not have a continuous available time long enough to store the content due to storage arrangement of the other contents, storage of the content is possible.

Also, when the external device is not in the content-storable state at the time set for the designated content by the transfer arranging unit, the transferring unit instructs the transfer arranging unit to set the time again.

According to this construction, in case the content cannot be transferred to the external device as initially arranged, the transfer of the content is performed later. Due to this, the content can be stored without burdening the user with another operation to indicate the storage of the content.

Also, the receiving apparatus may further comprise an expiry determining unit for determining an expiry date and time for each content accumulated in the first storage medium, the expiry date and time being a criterion for deleting the content, wherein the deleting unit deletes each content accumulated in the first storage medium after the expiry date determined for the content is passed, the transfer arranging unit arranges, when a user designation of a plurality of contents, out of the accumulated contents in the first storage medium, is accepted by the designation accepting unit, transfer of the designated contents so that the designated contents are transferred in an order of the expiry date determined by the expiry determining unit, and the transferring unit transfers the designated contents in the order arranged by the transfer arranging unit.

According to this construction, even when a large number of contents are designated to be stored, each content can be stored before deleted with higher probability.

Here, the receiving apparatus is connected to a plurality of external devices, the designation accepting unit further accepts a designation of one of the external devices from the user, the device information obtaining unit obtains the device state information from the designated external device, and the transferring unit transfers the designated content from the first storage medium to the second storage medium included in the designated external device, when the designated external device is in the content-storable state, by referring to the obtained device state information.

According to this construction, the user can freely select an external device into which the content is to be stored.

Also, the receiving apparatus is connected to a plurality of external devices, and may further comprise: a device determining information storage unit for storing device determining information associating a data format of a content and external devices that are capable of processing the content of the data format; and a storage target device determining unit for determining an external device that is associated with a data format of the designated content as a storage target device, by referring to the device determining information, wherein the device information obtaining unit obtains the device state information from the external device that is determined as the storage target device, and the transferring unit transfers the designated content from the first storage medium to the second storage medium included in the external device, when the external device that is determined as the storage target device is in the content-storable state, by referring to the obtained device state information.

According to this construction, the user is not required to designate a storage target device when designating a content desired to be stored, that is to say, the content desired to be transferred to another storage medium. The designated content is stored into an external device according to a data format of the designated content.

Here, the device determining information associates the data format of the content with the external devices, each external device being accompanied by a priority rating, and the storage target device determining unit (a) judges whether the second storage medium included in each of the external devices has a free space enough to store the designated content, in an order of the priority rating included in the device determining information, and (b) determines an external device with the highest priority rating as the storage target device, out of the external devices that are judged to have the free space enough to store the designated content.

According to this construction, the user is not required to designate a storage target device when designating a content desired to be stored. The designated content is automatically stored into an external device that has an enough free space.

Also, the receiving apparatus is connected to a plurality of external devices, and may further comprise: a device determining information storage unit for storing device determining information associating a genre of a content and external devices that are capable of processing the content of the genre, the genre showing a category of an entity of the content; and a storage target device determining unit for determining an external device that is associated with a genre of the designated content as a storage target device, by referring to the device determining information, wherein the device information obtaining unit obtains the device state information from the external device that is determined as the storage target device, and the transferring unit transfers the designated content from the first storage medium to the second storage medium included in the external device, when the external device that is determined as the storage target device is in the content-storable state, by referring to the obtained device state information.

According to this construction, the user is not required to designate a storage target device when designating a content desired to be stored. The designated content is stored into an external device according to a category of an entity of the designated content.

Here, the transferring unit determines bandwidth used to transfer the designated content, by referring to external device information, the external device information showing a capability of the external device to which the designated content is to be transferred, and transfers the designated content using the bandwidth.

According to this construction, the content can be transferred at the transfer speed suitable for the external device, depending on its processing capability. Therefore, the content can be transferred in a short period of time when the external device has a high processing capability.

Also, the receiving apparatus may further comprise a notification unit for notifying the user of a completion of the transfer when the arranged transfer of the designated content is completed.

According to this construction, the user can be notified that the storage of the content is completed.

Also, when the designated content is yet to be received by the receiving/accumulating unit, the transfer arranging unit arranges to start the transfer of the designated content from the first storage medium to the second storage medium as soon as the receiving/accumulating unit receives and accumulates the designated content in the first storage medium.

According to this construction, the user can arrange storage of the content before the content is broadcasted, so that the user can utilize the content stored in an external device of a storage target after the content is broadcasted.

Here, the designation accepting unit does not accept a user designation of a content that includes copy prohibition information indicating to prohibit a copy of the content, and accepts a designation of a content which does not include the copy prohibition information.

According to this construction, the content which is prohibited from being copied is not transferred from the storage medium into which the content is accumulated, to another storage medium.

Also, the receiving apparatus may further comprise the first storage medium, wherein the second storage medium is included in an external device that is connected to the receiving apparatus and that can be used by the user, and the transfer arranging unit (a) judges whether the external device has a function relating to a copy restriction when the designated content includes copy restriction information indicating to restrict a copy of the content, and (b) arranges the transfer of the designated content from the first storage medium to the second storage medium included in the external device only when judging that the external device has the function relating to the copy restriction.

According to this construction, the copy restriction can be thoroughly performed for the content which is restricted to be copied, such as the content which is permitted to be copied only once.

The above object can also be achieved by a content storage method for use in a receiving apparatus that receives and accumulates broadcast contents into a first storage medium to make each content available to a user, the content storage method comprising: a deleting step for deleting each content accumulated in the first storage medium; a designation accepting step for accepting a designation of a content from the user; a transfer arranging step for (a) judging whether transfer of the designated content from the first storage medium to a second storage medium before deletion of the designated content is possible, and (b) arranging the transfer of the designated content when judging that the transfer is possible; and a transferring step for transferring the designated content from the first storage medium to the second storage medium before the designated content is deleted, as arranged in the transfer arranging step.

According to this construction, the contents accumulated in the first storage will be deleted some time as the capacity of the first storage medium into which contents are successively received and accumulated is limited. With a simple user designation of a content desired to be stored, however, the content is transferred to another device before deleted. This enables the user to utilize the content any time.

The above object can also be achieved by a control program for making a receiving apparatus perform a content storage process, the receiving apparatus receiving and accumulating broadcast contents into a first storage medium to make each content available to a user and including a central processing unit, the control program comprising: a deleting step for deleting each content accumulated in the first storage medium; a designation accepting step for accepting a designation of a content from the user; a transfer arranging step for (a) judging whether transfer of the designated content from the first storage medium to a second storage medium before deletion of the designated content is possible, and (b) arranging the transfer of the designated content when judging that the transfer is possible; and a transferring step for transferring the designated content from the first storage medium to the second storage medium before the designated content is deleted, as arranged in the transfer arranging step.

According to this control program, the user is able to utilize contents that the user designates any time, out of the contents received by the receiving apparatus.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 4 shows examples of data structures and contents of content management information 2000 in a content management information storage unit 1141 stored by a control unit 1140;

FIG. 5 shows examples of data structures and contents of device management information 2100 in a device management information storage unit 1142 stored by the control unit 1140;

FIG. 10 shows a display example of the receiving apparatus 1100 on a liquid crystal display or the like, performed in the storage schedule cancel indication responsive process in step S121;

FIG. 19 shows examples of structures and contents of storage target device determining information;

FIG. 23 shows display examples of the receiving apparatus 6100 for the user to make various designations relating to storage of a content;

FIG. 24 shows examples of structures and contents of genre classified storage target device determining information;

FIG. 25 is a functional block diagram of a receiving apparatus 8100 relating to a fourth embodiment of the present invention;

FIG. 26 shows examples of data structures and contents of content management information 8300 in a content management information storage unit 8141 stored by a control unit 8141;

FIG. 28 is a diagram showing examples of structures and contents of a device information table stored by a modified receiving apparatus.

DESCRIPTION OF THE PREFERRED EMBODIMENTS

1. First Embodiment

The following explains a receiving system in an accumulation-type broadcast system relating to the first embodiment of the present invention, with reference to the drawings.

1-1. Construction

Figure 1:
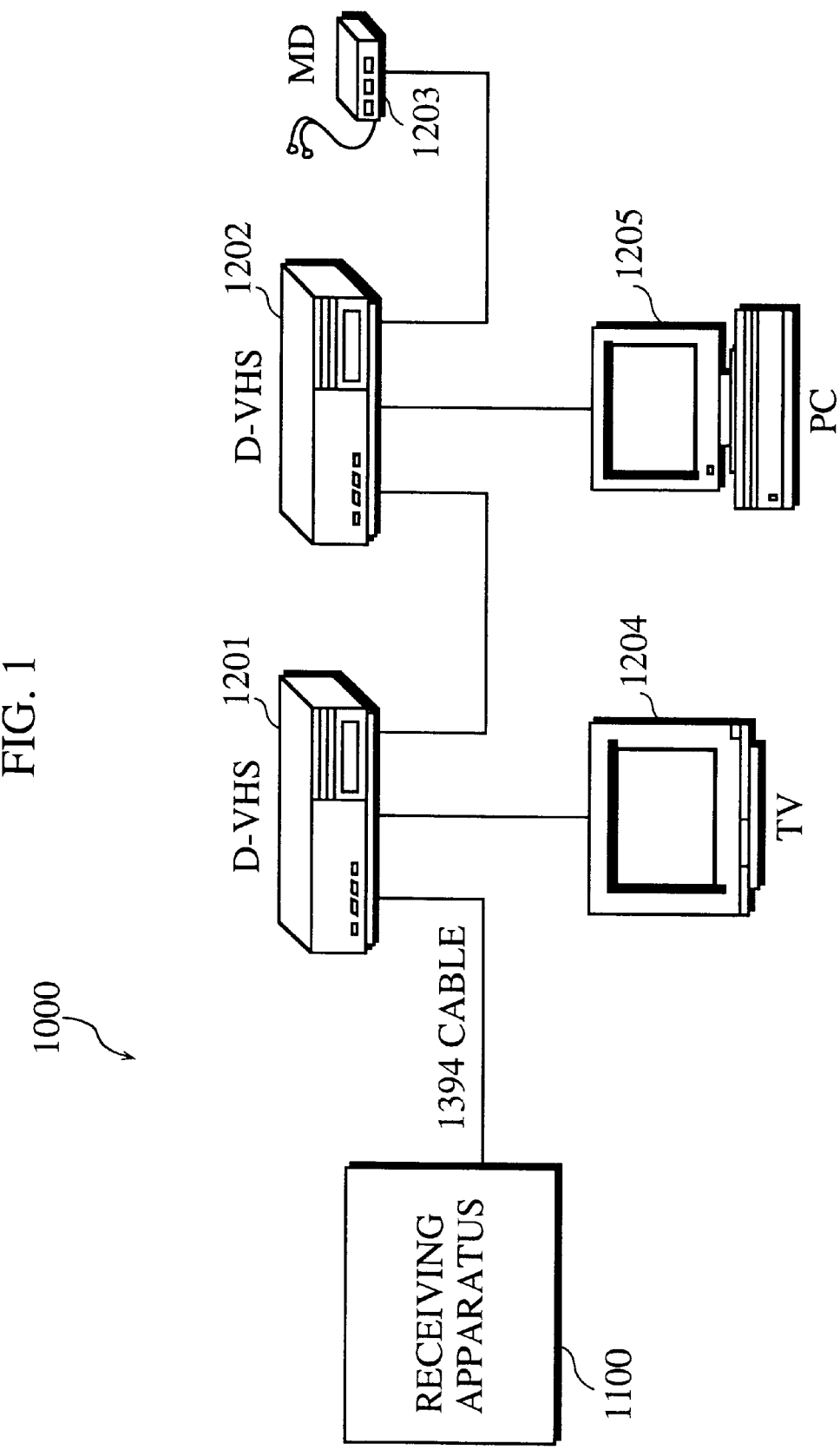
FIG. 1 shows an example construction of a receiving system 1000 relating to a first embodiment of the present invention.

FIG. 1 shows an example construction of a receiving system 1000 relating to the first embodiment of the present invention.

The receiving system 1000 is roughly constructed of a receiving apparatus 1100 and various external devices for storing or reproducing contents. The various external devices are connected to the receiving apparatus 1100 via an IEEE (Institute of Electrical and Electronics Engineers) 1394 serial bus based on IEEE1394 standard (hereafter referred to as a "1394 cable"). As the external devices, digital video recording/reproducing devices (D-VHS (1)) 1201 and (D-VHS (2)) 1202, a music recording/reproducing device (MD) 1203, a television monitor (TV) 1204, a personal computer (PC) 1205, a hard disc drive (HDD) (not illustrated), and an audio/video recording hard disc drive (AV-HDD) (not illustrated) are exemplified in the present embodiment.

In the accumulation-type broadcast system, a broadcasting apparatus broadcasts, according to a schedule determined beforehand, each content, such as a movie, music, and a newspaper, before the date and time set for the content to be available to the user (hereafter referred to as the "start date and time").

Each content broadcasted by the broadcasting apparatus is received by the receiving apparatus 1100 according to a user indication, and is accumulated in a storage medium, such as a hard disc, equipped in the receiving apparatus 1100.

Once accumulated, the content becomes available to the user. The accumulated content is transferred to an external device such as a television monitor connected to the receiving apparatus 1100 via the 1394 cable, according to a user indication of display, reproduction, or the like. The external device then displays or reproduces the content.

It is assumed here that signals are transmitted between the receiving apparatus 1100 and the external device in accordance with IEEE1394, IEEE1394TA (Trade Association) which relates to control between a plurality of functions connected via a bus, or other protocols.

Each content accumulated in the storage medium in the receiving apparatus 1100 can be deleted after a certain period set by the user. Here, the period is set as one week after a date to which the start date and time of the content belongs. Accordingly, the receiving apparatus 1100 sets an expiry date for each content, as one week after a date to which the start date and time of the content belongs. In a case where a free space in the storage medium is insufficient or the like, the receiving apparatus 1100 deletes a content whose expiry date has been passed.

This means that the user can utilize a content, that is, make the content displayed or reproduced, if it is within one week from the start date and time of the content. However, unless instructing the receiving apparatus 1100 to store the content, the user may not be able to utilize the content after one week passes from the start date and time.

The receiving apparatus 1100 transfers a content to which the user indication to store has been made, namely, a content to which the user indication to transfer the content to a certain external device has been made, to the external device connected thereto via the 1394 cable. The content is then recorded on a storage medium such as a hard disc equipped in the external device. This enables the user to operate the external device to use the transferred content any time, that is, to display or reproduce the content any time.

Figure 2:
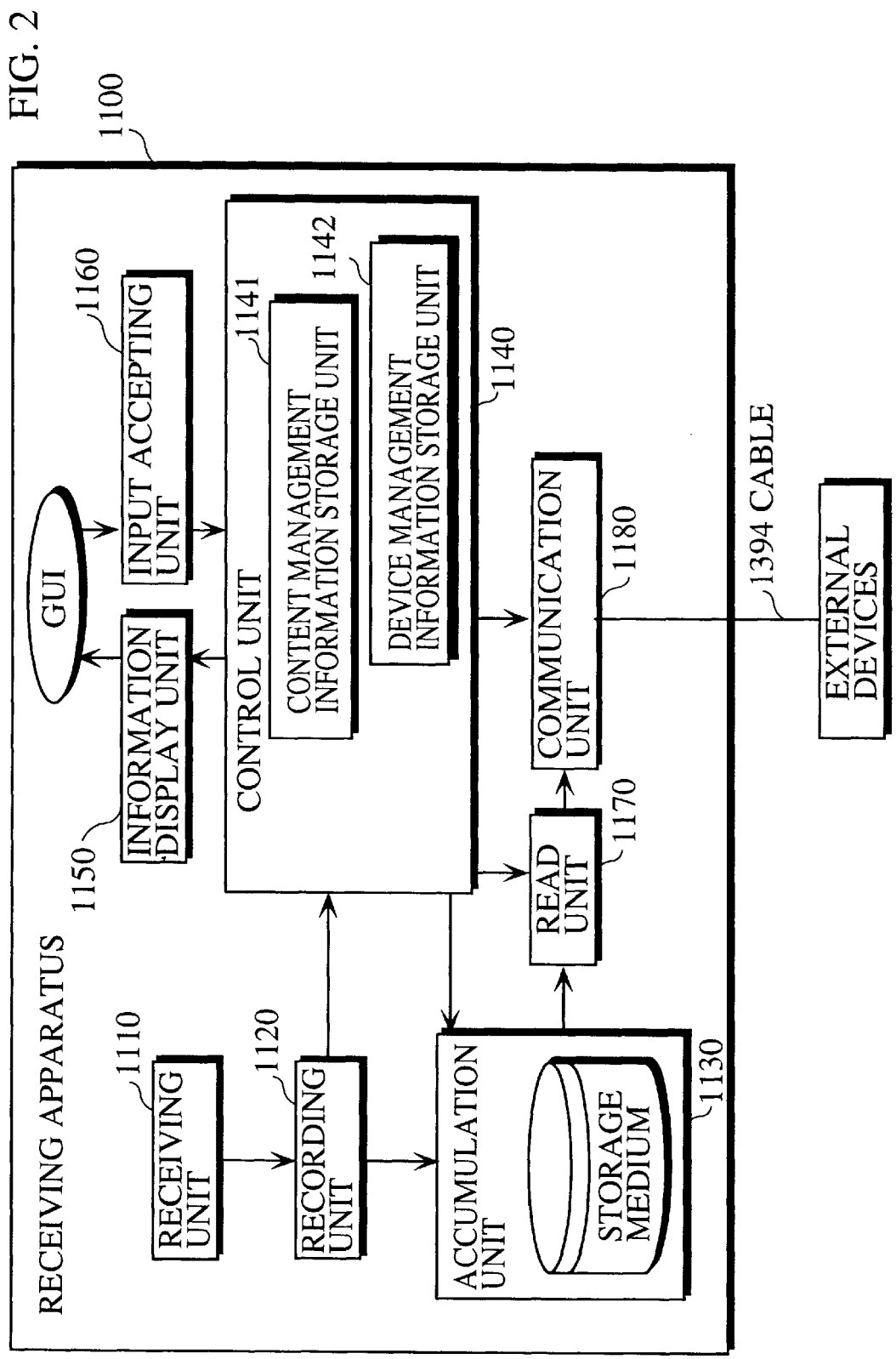
FIG. 2 is a functional block diagram of a receiving apparatus 1100 relating to the first embodiment of the present invention.

FIG. 2 is a functional block diagram of the receiving apparatus 1100 relating to the first embodiment of the present invention.

The receiving apparatus 1100 has the functions of receiving and accumulating contents broadcasted by the broadcasting apparatus, and controlling external devices connected to the receiving apparatus 1100 via the 1394 cable. The receiving apparatus 1100 is an apparatus of a so-called set-top box equipped with a storage medium with a large capacity, the functions of which are expanded. To operate the receiving apparatus 1100, for example, the user uses a remote-controller.

The receiving apparatus 1100 functionally includes a receiving unit 1110, a recording unit 1120, an accumulation unit 1130, a control unit 1140, an information display unit 1150, an input accepting unit 1160, a read unit 1170, and a communication unit 1180.

The receiving unit 1110 includes a tuner and a buffer memory, and functions as the following. The receiving unit 1110 controls the tuner to receive a broadcast content via an antenna, a cable, and the like, subjects the content to digital demodulation as one example, and stores the resulting content in the buffer memory.

The recording unit 1120 has the function of receiving an indication from the control unit 1140, reading a content according to a user indication from the buffer memory, and accumulating the content in the accumulation unit 1130.

The accumulation unit 1130 is roughly constructed of a storage medium such as a hard disk with a large capacity, and is capable of accumulating contents.

The information display unit 1150 receives an indication from the control unit 1140, and displays information, for example, on a liquid crystal display that may be equipped in the receiving apparatus 1100.

The input accepting unit 1160 is made up of a remote-controller signal receiving circuit, or the like. The input accepting unit 1160 receives signals transmitted from a remote-controller to accept an indication made by the user operating the remote-controller, and sends the user indication to the control unit 1140.

The information display unit 1150 and the input accepting unit 1160 constitute a user interface such as a graphical user interface (GUI).

The control unit 1140 is constructed of a memory, a processor, and the like. The functions of the control unit 1140 to control each unit in the receiving apparatus 1100 are realized by the processor executing a control program stored in the memory. The control unit 1140 includes a content management information storage unit 1141 and a device management information storage unit 1142.

The content management information storage unit 1141 is a memory area for storing content management information that is information relating to each content accumulated in the accumulation unit 1130.

The device management information storage unit 1142 is a memory area for storing device management information that is information relating to each external device connected to the receiving apparatus 1100 via the 1394 cable. Note that the content management information and the device management information will be explained in detail later.

The control unit 1140 has the following functions. The control unit 1140 accepts a user designation of a content to be stored via the input accepting unit 1160, and controls the recording unit 1120. Also, the control unit 1140 collects device information relating to a name and a capability of each external device connected to the receiving apparatus 1100 via the 1394 cable, and updates the device management information. Moreover, the control unit 1140 obtains information relating to each content accumulated in the accumulation unit 1130 by the recording unit 1120, updates the content management information, and displays a list of the accumulated contents, based on the content management information, via the information display unit 1150. The control unit 1140 accepts a user indication relating to a content to be stored via the input accepting unit 1160. The control unit 1140 performs control to store the content in accordance with this user indication. Furthermore, the control unit 1140 deletes a content which is expired, that is to say, a content whose expiry date of one week after a date to which the start date and time belongs is passed, in a case where a free space in the accumulation unit 1130 is insufficient, like when 80% of its total capacity is occupied.

The read unit 1170 has the functions of reading a content accumulated in the accumulation unit 1130, upon receipt of an indication from the control unit 1140, and transferring the read content to the communication unit 1180.

The communication unit 1180 has the functions of communicating with the external devices, such as a D-VHS and a PC, connected to the receiving apparatus 1100 via the 1394 cable. Upon receipt of an indication from the control unit 1140, the communication unit 1180 transmits a command to each external device to receive a response from each external device, and transfers the content transferred from the read unit 1170, to a certain external device.

The receiving apparatus 1100 is also equipped with a time register for keeping the current date and time, so that the control unit 1140 is able to obtain the current date and time.

Figure 3:
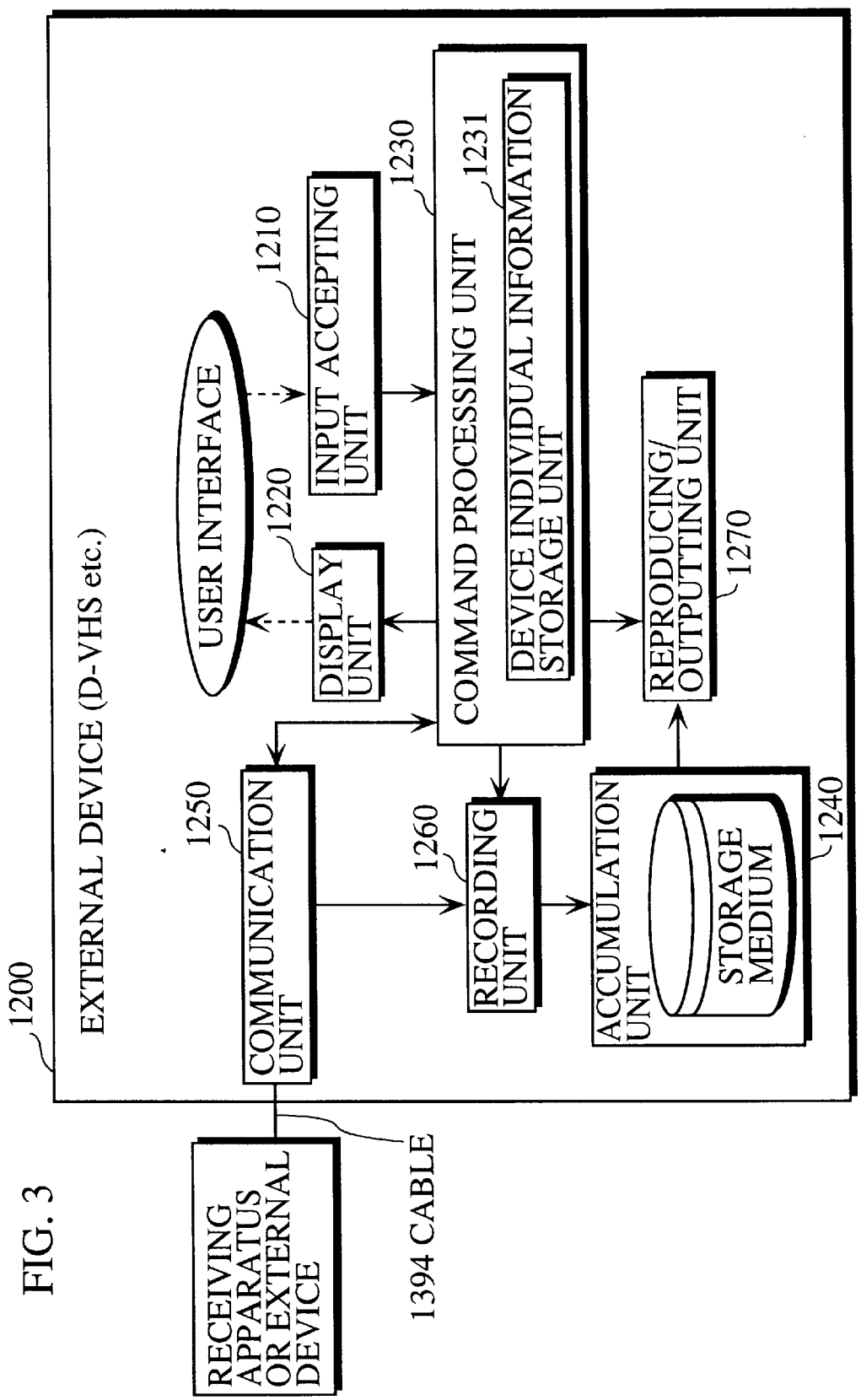
FIG. 3 is a functional block diagram of an external device 1200 showing a representative example of a D-VHS, an MD, a TV, a PC, or the like, connected to the receiving apparatus 1100.

FIG. 3 is a functional block diagram of an external device 1200 showing a representative example of a D-VHS, an MD, a TV, a PC, HDD, AV-HDD, and the like, connected to the receiving apparatus 1100.

The external device 1200 may reproduce a content upon receipt of a user operation. Also, the external device 1200 receives a content or a command transmitted from the receiving apparatus 1100 and executes a process according to the received command. The external device 1200 includes an input accepting unit 1210, a display unit 1220, a command processing unit 1230, an accumulation unit 1240, a communication unit 1250, a recording unit 1260, and a reproducing/outputting unit 1270.

The input accepting unit 1210 is equipped with an input button or the like. The input accepting unit 1210 accepts a user indication via the input button, and sends the received indication to the command processing unit 1230. The display unit 1220 displays information transmitted to the command processing unit 1230, on a liquid display panel or the like equipped in the external device 1200. The input accepting unit 1210 and the display unit 1220 constitute a user interface.

The accumulation unit 1240 includes a storage medium such as a hard disc with a large capacity, and is capable of storing contents in the storage medium.

The command processing unit 1230 is constructed of a memory, a processor, and the like. The functions of the command processing unit 1230 to control each unit in the external device 1200 are realized by the processor executing a control program stored in the memory. The command processing unit 1230 has the functions of executing a process corresponding to a user indication accepted via the input accepting unit 1210 or corresponding to a command transmitted from the receiving apparatus 1100 via the communication unit 1250. Also, the command processing unit 1230 includes a device individual information storage unit 1231 storing device information relating to a name and a capability of the external device 1200, and information relating to a state of the external device 1200.

Here, the device information relating to a capability of the external device 1200 includes an available command, a type of a processable content, and a free space in its storage medium for storing a content. The information relating to a state of the external device 1200 is information as to whether the user is currently using the external device 1200 (in other words, "the device is busy").

The device individual information storage unit 1231 is constructed of an area in a configuration ROM, and other memories. In the device information storage unit 1231, unchangeable information is stored in such an area in the configuration ROM specified by IEEE1394 to allow the manufacturer of the device to access freely. The unchangeable information stored in the configuration ROM can be read out by the receiving apparatus 1100. In the device individual information storage unit 1231, changeable information, such as information relating to a free space in the storage medium and information as to whether the external device 1200 is busy, is updated in accordance with the state of the external device 1200 such as a free space in the storage medium, checked in a predetermined cycle, for example, every time the command processing unit 1230 performs a process in accordance with a user input.

The command processing unit 1230 also has the function of transmitting information relating to the external device 1200 to the receiving apparatus 1100 via the communication unit 1250, in response to a specific command transmitted from the receiving apparatus 1100.

The communication unit 1250 communicates with the outside via the 1394 cable, and functions as the following. The communication unit 1250 receives a content and a command from the receiving apparatus 1100, and transfers the content to the recording unit 1260 and the command to the command processing unit 1230. Also, the communication unit 1250 transmits information transmitted from the command processing unit 1230 in response to the command, to the receiving apparatus 1100.

The recording unit 1260 has the function of receiving an indication from the command processing unit 1230, and storing the content transferred from the communication unit 1250 into the accumulation unit 1240.

The reproducing/outputting unit 1270 has the function of receiving an indication from the command processing unit 1230, reading the content stored in the accumulation unit 1240, and displaying, reproducing, or externally outputting the content. The reproducing/outputting unit 1260 may include an audio and video decoder that decompresses compressed audio data or video data, such as an MPEG decoder.

1-2. Data

The following explains the content management information and the device management information utilized by the receiving apparatus 1100.

FIG. 4 shows examples of data structures and contents of content management information 2000 in the content management information storage unit 1141 stored by the control unit 1140.

The content management information 2000 is information about each content accumulated in the accumulation unit 1130 by the recording unit 1120. This includes information necessary for storing a content into external devices. As shown in the figure, the content management information 2000 is made up of a "content name" field 2001, a "date and time" field 2002, a "type" field 2003, a "genre" field 2004, an "amount" field 2005, an "expiry date" field 2006, a "storage target" field 2007, a "storage state" field 2008, and a "storage completion notice" field 2009.

Here, the content name field 2001 shows information such as a name that identifies a content. The date and time field 2002 shows the start date and time of the content.

Also, the type field 2003 shows a type of the content, such that the content is "AUDIO AND VIDEO", "AUDIO", "STILL IMAGE", or "CHARACTER STRING". The type here indicates a data format of the content.

Examples of the data format are the AV stream data format, the JPEG (Joint Photographic Coding Experts Grout) format, the WAV format, the MIDI (Musical Instrument Digital Interface) format, the MP3 (MPEG-1 layer-3) format, a text data format, and a program file format.

For ease of explanation, the type of each content is expressed in the following way in the present embodiment. The expression "AUDIO AND VIDEO" indicates the AV stream format, the expression "AUDIO" indicates the WAV format that is a data format showing a waveform of music, and the expression "STILL IMAGE" indicates the JPEG format. The AV stream format varies as the following examples. Video signals may be encoded in the MPEG-2 format and audio signals may be encoded in the MPEG-2 layer-2 format. The audio signals may also be encoded in the MPEG-1 layer-2 format. For ease of explanation, however, the AV stream indicated by the expression "AUDIO AND VIDEO" only indicates one type of format in the present embodiment.

The genre field 2004 shows identification information relating to an entity of each content. For example, the genre field 2004 indicates either of "MOVIE", "SPORTS", "DRAMA", "MUSIC", "SOUND EFFECT", "NEWSPAPER", and "GAME".

The receiving apparatus 1100 has a mechanism of obtaining an EPG (Electric Program Guide) or the like. The control unit 1140 refers to the EPG or refers to a so-called header part of each content accumulated in the accumulation unit 1130, to set the content name field 2001, the date and time field 2002, the type field 2003, and the genre field 2004.

The amount field 2005 shows a data amount of each content accumulated in the accumulation unit 1130. In the figure, it should be noted that the time taken for reproduction of a content is set as a data amount of an audio and video content and an audio content.

The expiry date field 2006 shows information indicating a period where each content is ensured not to be deleted. The control unit 1140 sets the expiry date for each content, as one week after a date to which the start date and time of the content belongs.

The storage target field 2007 shows a device name that identifies an external device into which each content is to be stored. In the storage target field 2007, a device name designated by the user as the storage target is set. It should be noted here that the storage target field 2007 does not show a device name but shows a value indicating no storage target for a content that is not designated to be stored by the user.

The storage state field 2008 shows information as to whether each content has been stored due to the control by the control unit 1140.

Also, the storage completion notice field 2009 shows information as to whether a notice to the user is necessary when storing each content is completed, or as to whether the notice has already been given.

Referring now to examples shown in the figure, an audio and video content whose entity is a movie named "MOVIE1" has the start date and time of 10 o'clock on June 1, the amount of 3 hours, and the expiry date of June 8. The storage target device is "D-VHS(1)" and the storage completion notice is requested, which are designated by the user. Also shown in the figure is that this content has not yet been stored.

An audio and video content whose entity is a sports program named "SPORTS2" has the start date and time of 14 o'clock on June 1, the amount of 1 hour and 30 minutes, and the expiry date of June 8. The storage target device is "D-VHS (2)" and the storage completion notice is not requested, which are designated by the user. Also shown in the figure is that this content has not yet been stored.

A still image content whose entity is a newspaper named "NEWS6/2" has the start date and time of 0 o'clock on June 2, the amount of 2 megabytes, and the expiry date of June 9. The storage target device is "PC", the content has already been stored, and the storage completion notice has already been given.

Also, the figure shows that an audio content whose entity is music named "MUSIC2" whose start date and time is 21 o'clock on June 1, is not given a user indication to store, meaning that the content is not to be stored.

Note here that the control unit 1140, when deleting a content which has been expired, also deletes information relating to the content in the content management information 2000.

FIG. 5 shows examples of data structures and contents of device management information 2100 in the device management information storage unit 1142 stored by the control unit 1140.

The device management information 2100 shows information relating to each external device connected to the receiving apparatus 1100, and includes a "device name" field 2100, a "device information" field 2102, a "state" field 2103, and a "storage schedule information" field 2104. The device name and the device information are collected by the control unit 1140 via the communication unit 1180. The storage schedule information relates to a time schedule for content storage processes to be performed on a storage target device.

Information relating to each external device is collected either by reading the information from a configuration ROM of the external device, or inquiring the information of the external device using a specific command to obtain a response from the external device. An example of the specific command is an AV/C command specified by IEEE1394TA. The receiving apparatus 1100 transmits the AV/C command to each external device, using the FCP frame of an asynchronous packet of IEEE1394, so as to receive a response from the external device of a command list of an AV/C command that can be processed with the external device.

In the device management information 2100, the device name field 2101 shows a name that identifies each external device.

The device information field 2102 shows information such as an available command "PLAY" for example, which designates to reproduce a content, a type of a processable content, and a free space in the storage medium, and a speed at which a transferred content is received and processed.

The state field 2103 shows information as to whether the user is currently using the external device, (hereafter referred to as "the external device is busy").

Also, the storage schedule information field 2104 shows the association of a content name and a start time and an end time of its storage process.

Referring now to examples shown in the figure, the device "D-VHS (1)" that is capable of storing an audio and video content, and whose available command is "xx" and the like, is now in an available state as the user is not currently using the device. The device "D-VHS(1)" has the scheduled storage processes of: a content "MOVIE51" between 10:00 to 10:50 on June 3; a content "MOVIE1" between 10:50 to 12:05 on June 3; and a content "MOVIE53" between 13:00 to 14:00 on June 3.

The device "D-VHS (2)" that is capable of storing an audio and video content, and whose available command is "xx" and the like, is currently busy as the user is using the device. The device "D-VHS(2)" has the scheduled storage process of a content "SPORTS2" between 11:00 to 11:33 on June 3.

1-3. Operations

The following explains an operation of the receiving apparatus 1000 having the construction as described above.

The receiving apparatus 1100 displays an EPG as one example, via the information display unit 1150, so as to receive a user designation of a content to be accumulated. The receiving unit 1100 receives the designated content when broadcasted, and the recording unit 1120 accumulates the content into the accumulation unit 1130.

When the content is accumulated in this way, the control unit 1140 sets an expiry date for the content as one week from a date to which the start date and time of the accumulated content belongs, adds information relating to the accumulated content to the content management information stored in the content management information storage unit 1141, and sets the content name field 2001, the date and time field 2002, the type field 2003, the genre field 2004, the amount field 2005, and the expiry date field 2006 for the content. In a case where the content management information is not yet stored in the content management information storage unit 1141, the control unit 1140 generates content management information and stores the generated content management information in the content management information storage unit 1141.

1-3-1. Storage Indication Responsive Process

The receiving apparatus 1100 performs a storage indication responsive process when the user performs an operation for giving a storage indication and the input accepting unit 1160 accepts this indication. As one example, a remote-controller is provided with a button showing "STORAGE SCHEDULE" beforehand. When the user presses the button, the input accepting unit 1160 accepts it as the storage indication.

The storage indication responsive process is to schedule a storage process when the storage indication is received from the user.

The following is an explanation of the storage indication responsive process.

Figure 6:
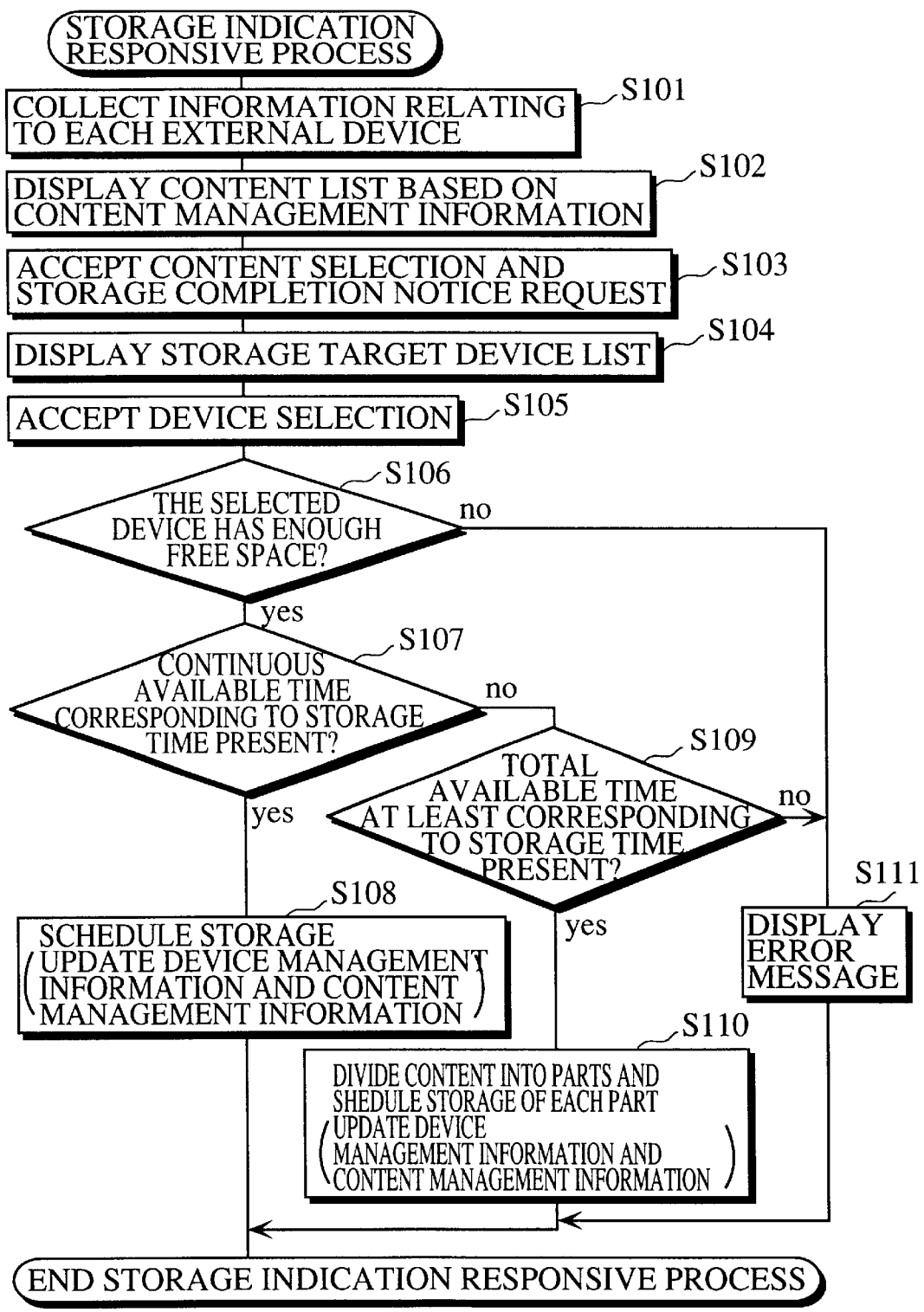
FIG. 6 is a flowchart showing a storage indication responsive process performed to schedule a storage process when the receiving apparatus 1100 receives a storage indication from the user.

FIG. 6 is a flowchart showing the storage indication responsive process performed to schedule the storage process when the receiving apparatus 1100 receives the storage indication from the user.

The control unit 1140 in the receiving apparatus 1100 collects information relating to each external device connected to the receiving apparatus 1100 via the 1394 cable, by way of the communication unit 1180. The information relating to each external device includes a device name, device information, and information as to whether the external device is busy or not. The control unit 1140 then updates the device management information stored in the device management information storage unit 1142 (step S101). When the device management information has not been stored in the device management information storage unit 1142, the control unit 1140 generates device management information and stores the generated device management information into the device management information storage unit 1142.

After collecting the information relating to each external device, the control unit 1140 generates, based on the content management information, a list of a content name, a date and time, a type, a genre, an amount, and an expiry date, of each content accumulated in the accumulation unit 1130, and displays the generated list via the information display unit 1150 (step S102). The control unit 1140 accepts a user designation of a content to be stored, and a user request of a storage completion notice when such a notice is necessary, via the input accepting unit 1160 (step S103).

After accepting such user designations, the control unit 1140 retrieves external devices that can be a storage target of the designated content according to a type of the content, by referring to the device management information. The control unit 1140 then displays a list of the retrieved external devices via the information display unit 1150 (step S104). In response to this, the user selects one external device from the displayed list of the external devices, and designates the external device as a storage target. The control unit 1140 accepts the user designation of the external device as the storage target, via the input accepting unit 1160 (step After receiving the designation of the storage target device, the control unit 1140 judges whether a storage medium of the designated device has an enough free space to store the content (step S106). To be more specific, the control unit 1140 refers to the content management information and the device management information and judges whether the storage target device has a free space at least corresponding to a data amount of the designated content. It should be noted here that the control unit 1140 also refers to other contents for which storage processes are scheduled to be performed. Taking data amount of these other contents into account, the control unit 1140 determines whether there is an enough free space to store the content designated in step 103.

If the control unit judges that the storage medium does not have an enough free space in step S106, the control unit 1140 displays an error message via the information display unit 1150 (step S111), and ends the storage indication responsive process.

If the control unit judges that the storage medium has an enough free space in step S106, the control unit 1140 calculates the time taken to store the designated content, by referring to such information as the data amount of the content and the speed at which the storage target device receives the transferred data and processes the data. The control unit 1140 then refers to the storage schedule information in the device management information to check whether there is a continuous available time period that corresponds to the time taken to store the content, before the expiry date of the content (step S107). Here, the continuous available time period is a time period during which no storage process is scheduled.

If the control unit 1140 finds that there is a continuous available time period that corresponds to the time taken to store the content, the control unit 1140 sets the earliest time during the time period, as a start time of the storage process. The control unit 1140 writes a name of the content, the start time and the end time of the storage process, to the storage schedule information field 2104 associated with the storage target device, in the device management information. Also, the control unit 1140 writes the external device designated by the user in the storage target field 2007, "NOT STORED" in the storage state field 2008, and "NECESSARY" or "UNNECESSARY" according to a user indication in the storage completion notice field 2009 in the content management information (step S108). This completes the storage indication responsive process.

If the control unit 1140 finds that there is no continuous available time period that corresponds to the time taken to store the content, the control unit 1140 checks whether the total of available time periods before the expiry date of the content is at least the time taken to store the content (step S109). If not, the control unit 1140 displays an error message via the information display unit 1150 (step S111), and ends the storage indication responsive process.

If the control unit 1140 finds that the total of available time periods is at least the time taken to store the content in step S109, the control unit 1140 determines to divide the content into a plurality of parts and store each part of the content in each available time period sequentially in the time order. The control unit 1140 writes the name of the content, a plurality of pairs of a start time and an end time of the storage process to the storage schedule information field 2104 in the device management information. The control unit 1140 also writes the external device designated by the user in the storage target field 2007, "NOT STORED" in the storage state field 2008, and "NECESSARY" or "UNNECESSARY" according to a user indication in the storage completion notice field 2009 in the content management information (step S110). This completes the storage indication responsive process.

It should be noted, when the control unit 1140 determines to store the content by performing the storage process a plurality of times, that is to say, by dividing the content into a plurality of parts and performing a storage process of each part of the content, the storage schedule information field 2104 is made to include information for each divided part, as to which part of the content is to be stored. Each part of the content is identified by time information such as a time stamp, or address information where the part of the content is recorded on the storage medium.

Figure 7:
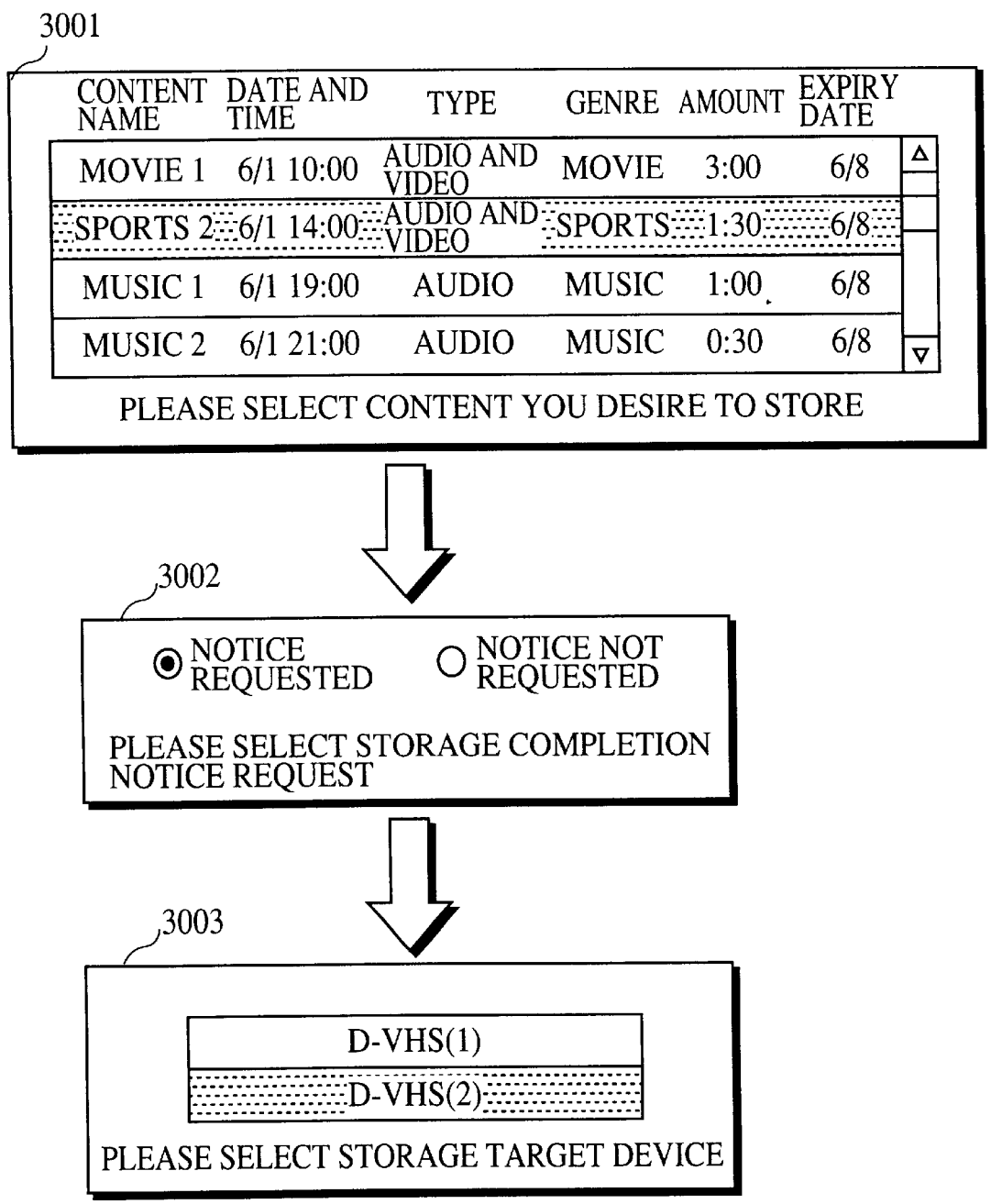
FIG. 7 shows display examples of the receiving apparatus 1100 for the user to make various designations relating to storage of a content.

FIG. 7 shows display examples of the receiving apparatus 1100 for the user to make various designations relating to storage of a content.

A display 3001 shows a list of contents displayed in step S102. In response to this display, the user selects a content he or she desires to store.

A display 3002 is a display for the user to designate whether to request a storage completion notice or not. This is displayed in step S103, so as to accept an input of the storage completion notice request.

A display 3003 is a list of external devices displayed in step S104. In response to this display, the user selects a storage target device.

Figure 8:
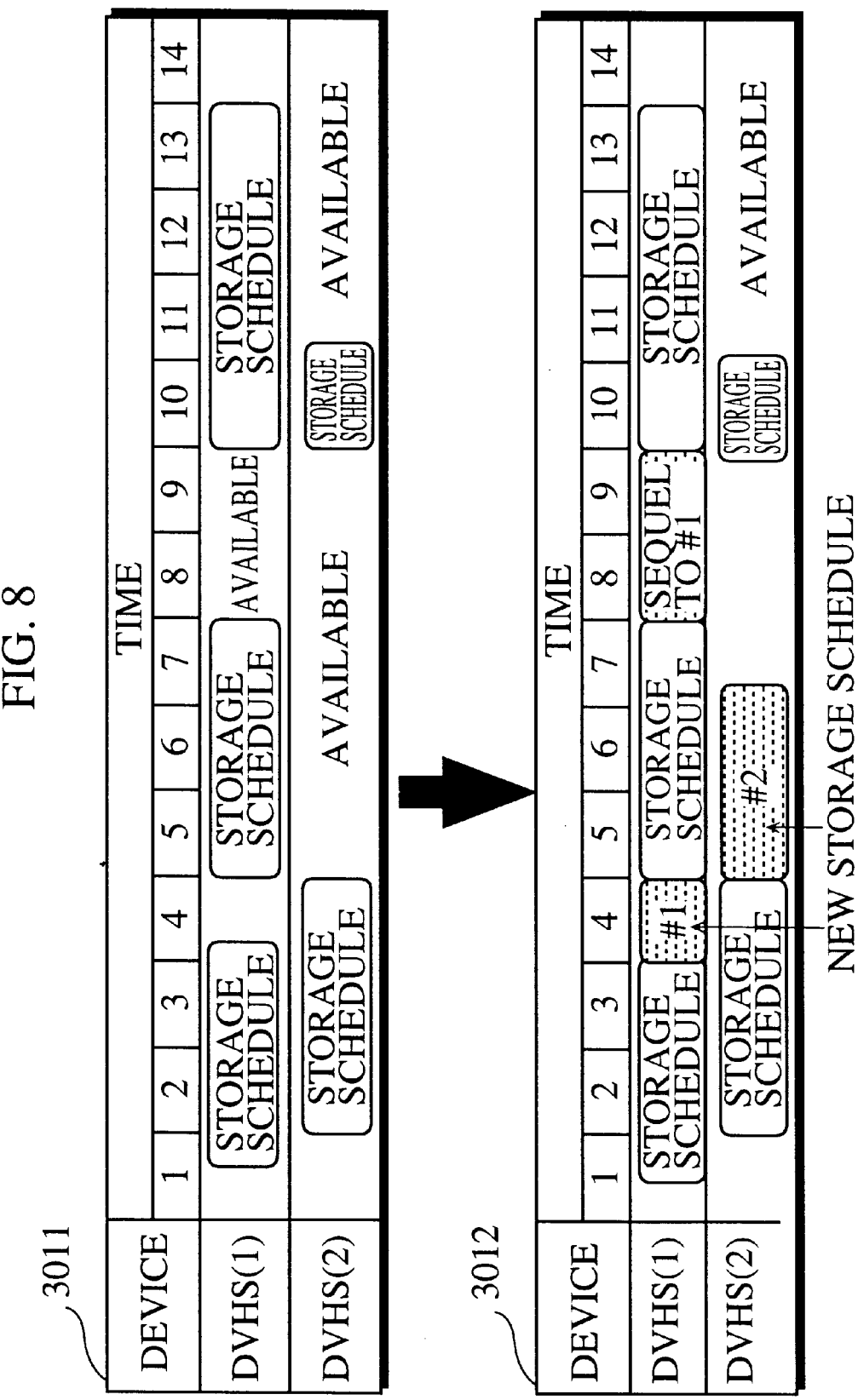
FIG. 8 shows timetables of an example schedule for each external device to perform storage processes indicated by storage schedule information.

FIG. 8 shows timetables of an example schedule for each external device to perform storage processes indicated by the storage schedule information in the device management information.

A timetable 3012 shows the schedule after adding some content storage processes to the schedule shown by a timetable 3011. In the timetable 3012, content storage processes indicated by a symbol "#1" for the device "D-VHS (1)", and a content storage process indicated by a symbol "#2" for the device "D-VHS(2)" are additionally scheduled. The storage processes indicated by the symbol "#1" are scheduled for divided content parts. The storage processes indicated by the symbol "#1" are scheduled in step S110, and the storage process indicated by the symbol "#2" is scheduled in step S108.

1-3-2. Storage Schedule Cancel Indication Responsive Process

The following explains a storage schedule cancel indication responsive process performed by the receiving apparatus 1100 when the user desires to cancel a storage schedule.

The storage indication responsive process described above is a process for the user to designate a content he or she desires to store. On the other hand, the receiving apparatus 1100 also provides the user with a method to cancel a once scheduled storage of a content. In detail, when accepting a user operation indicating to cancel a storage schedule via the input accepting unit 1160, the receiving apparatus 100 performs the storage schedule cancel responsive process. As one example, a remote-controller is provided with a button showing "STORAGE SCHEDULE CANCEL" beforehand. When the user presses the button, the input accepting unit 1160 accepts it as an indication to cancel the storage schedule.

Figure 9:
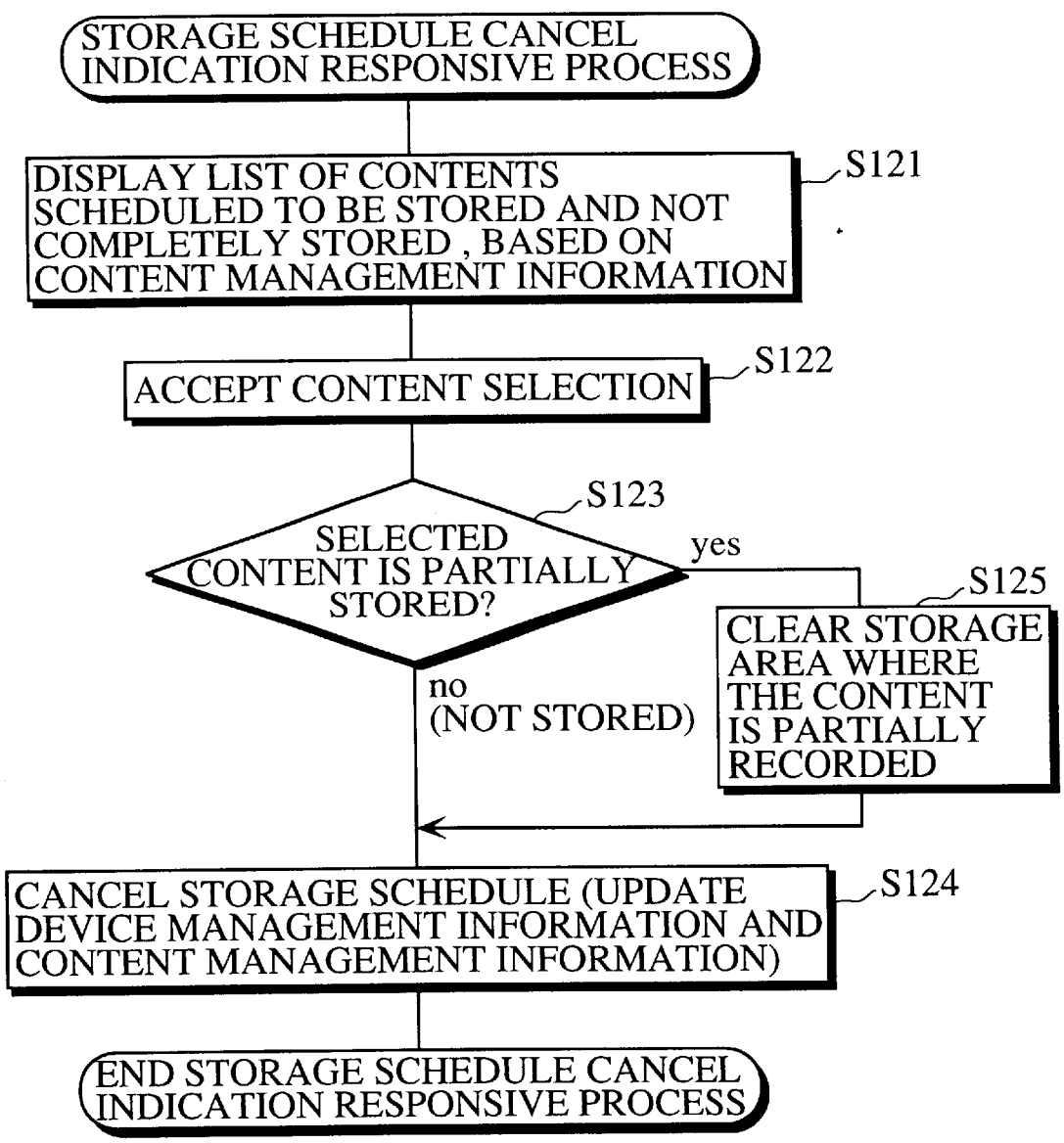
FIG. 9 is a flowchart showing a storage schedule cancel indication responsive process performed when the receiving apparatus 1100 receives a storage schedule cancel indication from the user.

FIG. 9 is a flowchart showing the storage schedule cancel indication responsive process performed when the receiving apparatus 1100 receives a storage schedule cancel indication from the user.

The control unit 1140 in the receiving apparatus 1100 generates, based on the content management information, a list of a content name, a date and time, a genre, an amount, an expiry date, a storage target, and a storage state of each content that is scheduled to be stored and is not completely stored, out of contents accumulated in the accumulation unit 1130. The control unit 1140 then displays the generated list via the information display unit 1150 (step S121).

FIG. 10 shows a display example of the receiving apparatus 1100 on a liquid crystal display or the like, in step S121 of the storage schedule cancel indication responsive process.

In the figure, information relating to contents that are not stored or that are partially stored is displayed as a list. "PARTIALLY STORED" indicates a state where at least a storage process of one part of a content has been performed, in a case where the content is divided into a plurality of parts and a storage process of each part is scheduled due to the following reasons. The storage target device does not have a continuous available time period that corresponds to the time taken to store the content before the expiry date of the content, or the transfer of the content is interrupted. Also, it is the state where the content management information 2000 has been updated so that "PARTIALLY STORED" is written in the storage state field 2008 during the storage process which will be described later. Note that the storage state will be updated from "PARTIALLY STORED" to "STORED" when the storage processes of all parts of the content are completed.

When the user selects a content he or she desires to cancel the storage schedule in correspondence with the display in FIG. 10, the control unit 1140 receives the selection of the content via the input accepting unit 1160 (step S122) The control unit 1140 then judges whether the selected content is partially stored or not stored, by referring to the content management information (step S123). If the content is not stored, the control unit 1140 cancels its storage schedule (step S124), and ends the storage schedule cancel responsive process.

Note that the cancel of the scheduled storage process in step S124 is specifically performed as follows. Information relating to the selected content is deleted from the storage schedule information field 2104 in the device management information associated with an external device identified by a device name obtained by referring to the storage target field 2007 in the content management information associated with the selected content. The destination target field 2007 is then updated to a value showing "NONE".

If the control unit 1140 judges that the selected content is partially stored in step S123, the control unit 1140 transmits a deletion command to an external device identified by a device name obtained by referring to the storage target field 2007 in the content management information (step S125) to cancel the scheduled storage process (step S124). The deletion command indicates to delete the content from the storage medium (step S125). The control unit 1140 ends the storage schedule cancel indication responsive process. Here, a content name may be transmitted together with the deletion command as its parameter. In this case, each external device connected to the receiving apparatus 1100 may have the function of deleting the content indicated by the deletion command from the storage medium, that is, the function of clearing an area associated with the content indicated by the deletion command within the storage medium. If provided with such a function, the external device deletes the content.

1-3-3. Storage Process

The following explains a storage process performed after the receiving apparatus 1100 receives the storage indication from the user.

Figure 11:
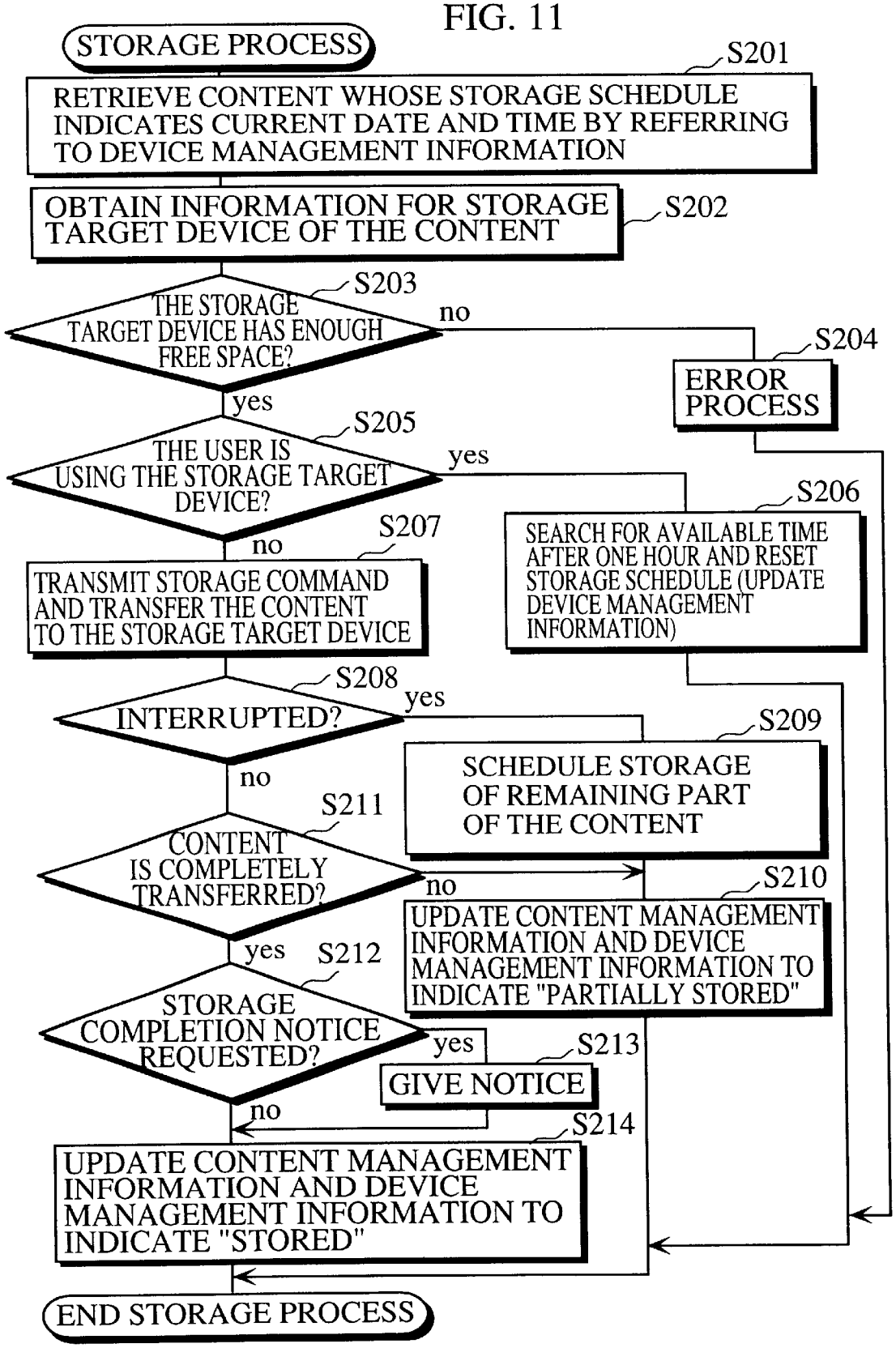
FIG. 11 is a flowchart showing the storage process performed by the receiving apparatus 1100.

FIG. 11 is a flowchart showing the storage process performed by the receiving apparatus 1100.

The control unit 1140 in the receiving apparatus 1100 obtains the current date and time from the time register equipped in the receiving apparatus 1100. The control unit 1140 then retrieves a content whose storage schedule indicates to perform the storage process at the obtained current date and time, by referring to the storage schedule information field 2104 in the device management information stored in the device management information storage unit 1142 (step S201). When there is no such content, the control unit 1140 waits for another one minute as one example, and repeats such a procedure that retrieves a content whose storage schedule indicates to perform the storage process at the current date and time.

After retrieving and detecting such a content whose storage schedule indicates to perform the storage process at the current time and date, the control unit 1140 obtains information relating to a storage target device of the detected content via the communication unit 1180. The control unit 1140 then updates the device management information stored in the device management information storage unit 1142 (step S202). This results in the device management information stored in the device management information storage unit 1142 to reflect information relating to the current state of the storage target device, including information relating to a free space, or information as to whether the external device is busy or not.

After collecting information relating to the storage target device, the control unit 1140 judges whether a storage medium of the external device has an enough free space, by referring to the device management information (step S203). If the above judgment result is negative, the control unit 1140 performs an error process such as notification of an error message (step S204), and ends the storage process. Note that the above judgment as to whether the storage medium has an enough free space is performed by comparing a data amount of the content to be stored and the free space of the storage medium.

If the control unit 1140 judges that the storage medium of the external device has an enough free space, the control unit 1140 judges whether the storage target device is busy or not (step S205). If this judgment result is positive, the control unit 1140 refers to the storage schedule information field 2104 in the device management information and scheduled a storage process again, in the following way. The control unit 1140 searches for an available time period after a predetermined time period, such as one hour, and schedules the storage process at the available time period. That is to say, the control unit 1140 updates the storage schedule information field 2104 (step S206), and ends the storage process.

If the control unit 1140 judges that the user is not using the storage target device in step S205, that is to say, the storage target device is available, the control unit 1140 transmits a storage command to the external device via the communication unit 1180, and transfers the content to the external device (step S207).

Here, the storage command is a command to instruct a storage operation, and is included in information set as the device information 2102 in the device management information, by collecting information relating to the external device. When the receiving apparatus 1100 collects the information relating to each external device in step S101 and other steps, it is assumed that each external device transmits information such as a command name of a command to perform the storage operation, to the receiving apparatus 1100. Also, when the control unit 1140 transmits the storage command to the storage target device, it is assumed that the control unit 1140 also transmits a content name and a data amount of the content together with the storage command as its parameter.

Also, for a content whose part is designated in the storage schedule information field 2104, that is, for the content to be partially stored, only the part of the content is transferred to the external device. An operation performed when the storage command is received by the storage target device will be described later.

After transmitting the storage command and transferring the content to the external device, the control unit 1140 judges whether the transfer of the content is interrupted or not (step S208). If the control unit 1140 judges that the transfer of the content is interrupted, the control unit 1140 schedules storage of an incomplete part of the content that has not been transferred. More specifically, the control unit 1140 refers to the storage schedule information field 2104 in the device management information, determines to perform the storage process of the incomplete part during an available time period, and sets the content name and the start time and the end time of the storage process (step S209). Also, the control unit 1140 writes "PARTIALLY STORED" in the storage state field 2008 in the content management information, deletes information relating to the already performed storage process (step S210), and ends the storage process. When the user operates the storage target device during the transfer of the content, the storage target device notifies the receiving apparatus 1100 of the interruption. Upon receipt of the interruption notification, the receiving apparatus 1100 suspends the transfer of the content, that is, the receiving apparatus 1100 ends the transfer of the content incompletely.

If the control unit 1140 judges that the transfer of the content is not interrupted in step S208, the control unit 1140 judges whether the content has been completely transferred, or only a divided part of the content has been transferred, by referring to the storage schedule information field 2104 (step S211). When only the divided part of the content has been transferred, the control unit 1140 writes "PARTIALLY STORED" in the storage state field 2008 in the content management information, deletes information relating to the already performed storage process from the storage schedule information field 2104 (step S210), and ends the storage process.

If the control unit 1140 judges that the content has been completely transferred in step S211, the control unit 1140 judges whether a storage completion notice is requested, by referring to the storage completion notice field 2009 associated with the content in the content management information (step S212).

If the control unit 1140 judges that the storage completion is requested in step S212, the control unit 1140 notifies the user of the storage completion by displaying a message to the effect that the content has been completely stored, the message including a content name of the stored content. Also, the control unit 1140 updates the storage completion notice field 2009 in the content management information to indicate that the notice has been already given (step S213).

If the control unit 1140 judges that the storage completion is not requested in step S212, or after the processing in step S213 has been executed, the control unit 1140 updates the storage state field 2008 in the content management information to indicate that the content has been stored, deletes information relating to the already performed storage process from the storage schedule information field 2104 in the device management information (step S214), and ends the storage process.

Referring now to an example shown in FIG. 4, information relating to the audio content "MUSIC1" in the content management information 2000 shows a case where the control unit 1140 updates the storage state field 2008 in the content management information 2000 to indicate that the content has been stored in step S214.

The receiving apparatus 1100 repeats the storage process shown in steps S201 through S214.

1-3-4. Storage Command Process

The following explains a storage command process performed by an external device, in correspondence with the storage process performed by the receiving apparatus 1100.

Figure 12:
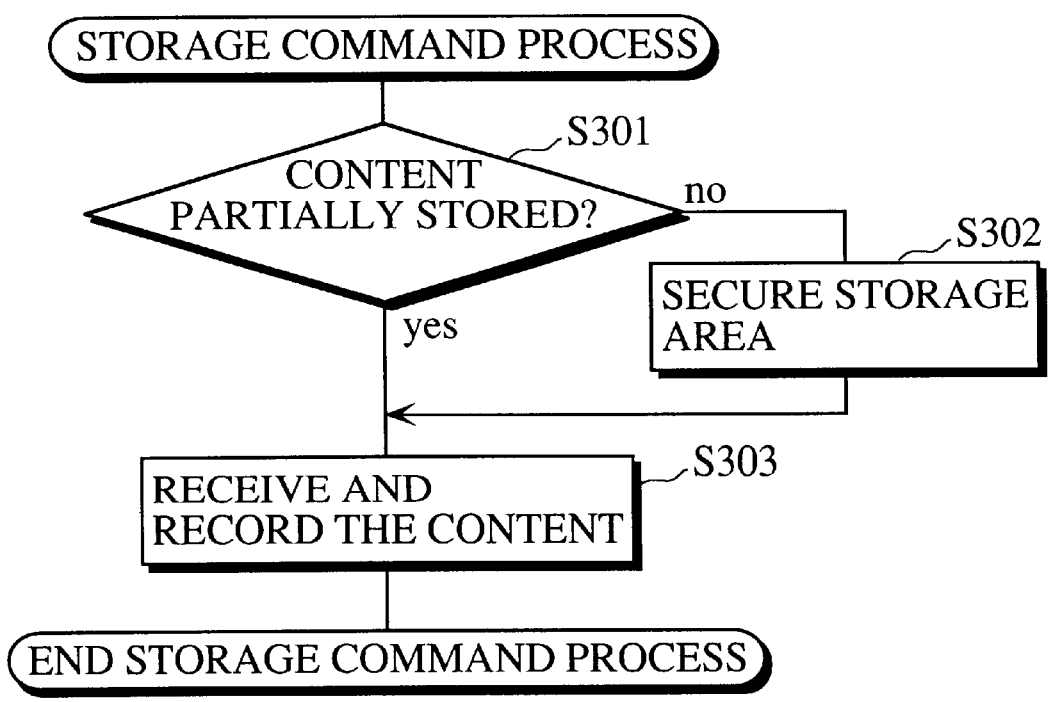
FIG. 12 is a flowchart showing a storage command process performed by the external device 1200 in correspondence with the storage process.

FIG. 12 is a flowchart showing the storage command process performed by the external device 1200 in correspondence with the storage process.

The command processing unit 1230 in the external device 1200 judges, upon receipt of the storage command from the receiving apparatus 1100 via the communication unit 1250, whether the content has been partially stored in the accumulation unit 1240 or not (step S301). If the content has not been stored at all, the command processing unit 1230 secures an area for storing the content in the storage medium in the accumulation unit 1240 (step S302). The securing the area is made based on a data amount that is a parameter of the storage command. The processing in step S302 results in securing an area enough to store the content as a whole. Also, the secured area is managed by the command processing unit 1230 in the external device 1200 in association with the content name that is a parameter of the storage command. This association is referred to in the above judgment in step S301. It is assumed that the command processing unit 1230 judges that the content has been partially stored when there is an area associated with a content name designated by the parameter of the storage command.

If the command processing unit 1230 judges that the content has been partially stored in step S301, or after the processing in step S302 has been performed, the command processing unit 1230 receives the content transferred by the receiving apparatus 1100 via the communication unit 1250. The command processing unit 1230 then makes the recording unit 1260 record the content into the area being associated with the content name in the storage medium in the accumulation unit 1240 (step S303).

Here, the command processing unit 1230 may control the recording unit 1260 to convert the format of the content before recording the content onto the storage medium. As one example, an MD may have the function of receiving a content in the WAV format and recording the content after compressing and converting the content in a format suitable for the MD.

The processing in step S303 results in the content to be stored into the storage medium in the external device 1200. It should be noted, in a case where the content has been partially stored in a storage area in the storage medium in the accumulation unit 1240 secured for storing the content in step S303, the recording unit 1260 records the remaining part of the content transferred by the receiving apparatus 1100 into an area following the storage area.

Also, in a case where storing the content is interrupted due to acceptance of the user operation via the input accepting unit 1210, or the like, the command processing unit 1230 notifies the receiving apparatus 1100 of the interruption via the communication unit 1250.

Once storing the content is completed in step S303 as described above, the content may be displayed or reproduced by the reproducing/outputting unit 1270 when an indication to display or reproduce is given by the user.

Also, in a case where a free space in the storage medium in the accumulation unit 1130 in the receiving apparatus 1100 is insufficient, like when 80% of its total capacity is occupied, the control unit 1140 refers to the content management information and deletes a content which is expired.

1-4. Considerations

In an accumulation-type broadcast system, the capacity of a large-capacity storage medium for accumulating contents received by a receiving apparatus is limited. Therefore, the receiving apparatus 1100 secures an empty area for accumulating a new content by deleting an already accumulated content some time. In view of this, there is a user demand to make a copy of a content he or she desires to utilize for a long period of time, out of the contents accumulated in the storage medium of the receiving apparatus 1100, and store the content into a storage medium of an external device. As described above, the receiving system 1000 satisfies this user demand. With a simple user operation of designating a desired content and a storage target device, the receiving system 1000 is capable of storing the designated content into the designated storage target device while the user is not using the device.

According to this construction, when the user desires to store a broadcast audio and video content, for example, the content can be stored into an external device such as a D-VHS, without requiring the user to set the storage start time and the like, but with requiring a simple user operation of designating the content and the storage target device. The content is stored while the user is not using the storage target device and the other recording is not scheduled, that is, at midnight for example.

2. Second Embodiment

The following explains a receiving system in an accumulation-type broadcast system relating to the second embodiment of the present invention, with reference to the drawings. The receiving system relating to the second embodiment has the same construction as the receiving system described in the first embodiment, with the only difference being in a part of the receiving apparatus. Accordingly, the present embodiment will be explained focusing on the receiving apparatus.

The receiving apparatus 1100 relating to the first embodiment schedules storage of a content designated to be stored by the user. More specifically, the receiving apparatus 1100 checks an available time period of a storage target device, determines the date and time to perform the storage process, and sets the storage schedule information field 2104 in the device management information. On the other hand, the receiving apparatus relating to the second embodiment arranges all the contents designated to be stored by the user in the order of expiry date and stores the arranged contents one after another. Note that components of the receiving apparatus relating to the second embodiment that are the same as the components of the receiving apparatus 1100 relating to the first embodiment are not explained in detail in the present embodiment.

2-1. Construction

Figure 13:
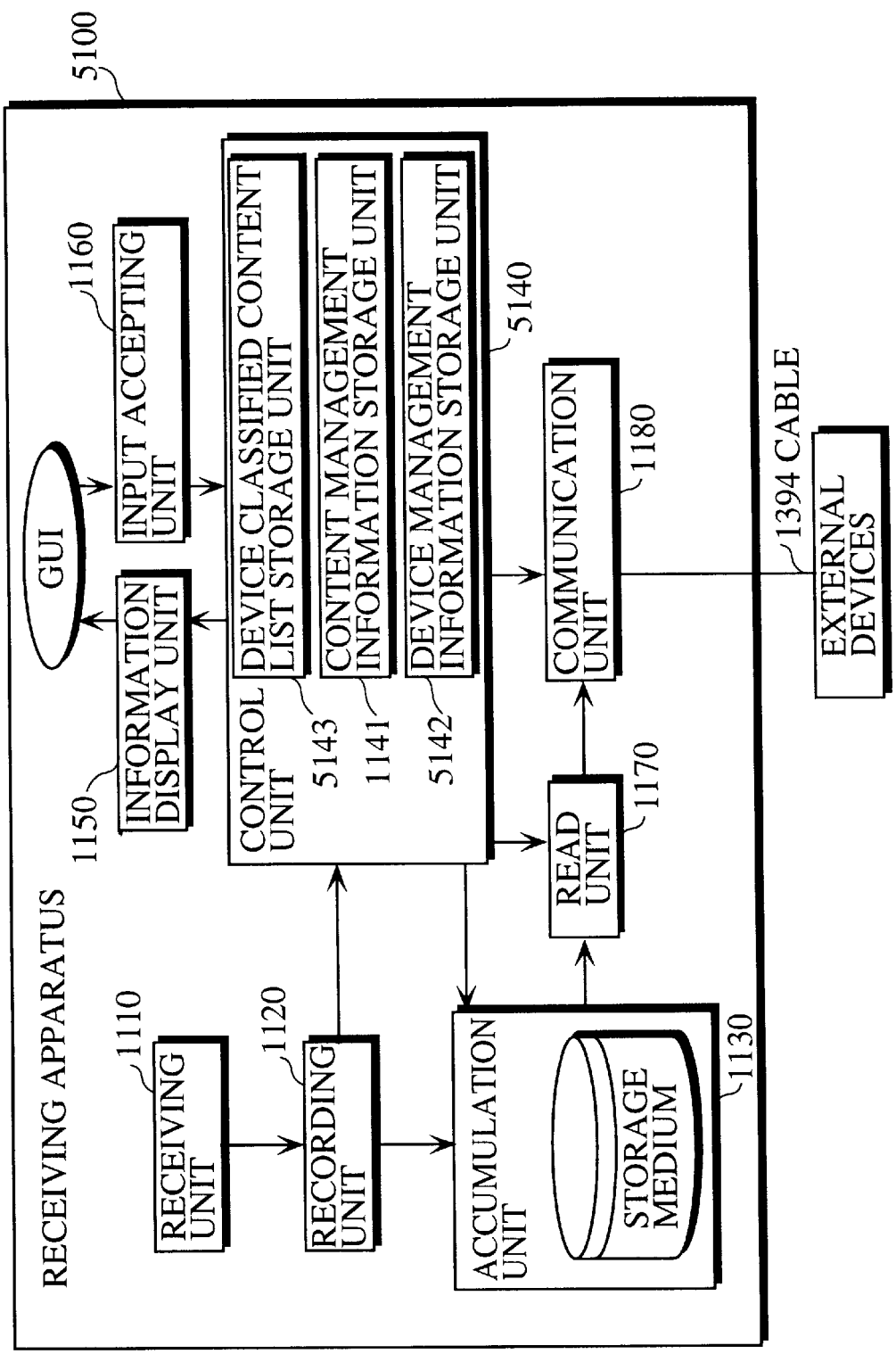
FIG. 13 is a functional block diagram of a receiving apparatus 5100 relating to a second embodiment of the present invention.

FIG. 13 is a functional block diagram of a receiving apparatus 5100 relating to the second embodiment of the present invention. In the figure, components that are the same as the components in FIG. 2 have been given the same reference numerals as before.

The receiving apparatus 5100 has the functions of receiving and accumulating broadcast contents, and controlling external devices connected to the receiving apparatus 5100 via the 1394 cable. The receiving apparatus 5100 functionally includes a receiving unit 1110, a recording unit 1120, an accumulation unit 1130, a control unit 5140, an information display unit 1150, an input accepting unit 1160, a read unit 1170, and a communication unit 1180. The receiving apparatus 5100 differs from the receiving apparatus 1100 relating to the first embodiment only in the control unit 5140.

Here, the control unit 5140 is constructed of a memory, a processor, and the like. The functions of the control unit 5140 to control each unit in the receiving apparatus 5100 are realized by the processor executing a control program stored in the memory. The control unit 5140 includes a device classified content list storage unit 5143, a content management information storage unit 1141, and a device management information storage unit 5142.

The device management information storage unit 5142 is a memory area for storing device management information that is information relating to each external device connected to the receiving apparatus 5100 via the 1394 cable. Note that the device management information stored in the device management information storage unit 5142 includes the same fields as in the device management information 2100 except not including the storage schedule information field 2104.

Also, the device classified content list storage unit 5143 is a memory area for storing, as a list, information relating to contents to be stored in each external device connected to the receiving apparatus 5100 via the 1394 cable. It should be noted that the entity of the device classified content list storage unit 5143 is hereafter referred to as a "device classified storage content list".

The control unit 5140 has the following functions. The control unit 5140 accepts a user designation of a content to be stored via the input accepting unit 1161, and controls the recording unit 1120. Also, the control unit 5140 collects device information relating to a name and a capability of each external device connected to the receiving apparatus 5100 via the 1394 cable, and updates the device management information. Moreover, the control unit 5140 obtains information relating to each content accumulated by the recording unit 1120, updates the content management information, and displays a list of the contents stored based on the content management information via the information display unit 1150. Also, the control unit 1140 may accept a user indication relating to a content to be stored, via the input accepting unit 1160, so as to perform control to store the content in accordance with this user indication. Furthermore, the control unit 5140 deletes a content which is expired, that is to say, a content whose expiry date of one week after a date to which the start date and time belongs is passed, in a case where a free space in the accumulation unit 1130 becomes insufficient, like when 80% of its total capacity is occupied.

2-2. Data

The following explains the device classified content list stored in the device classified content list storage unit 5143.

Figure 14:
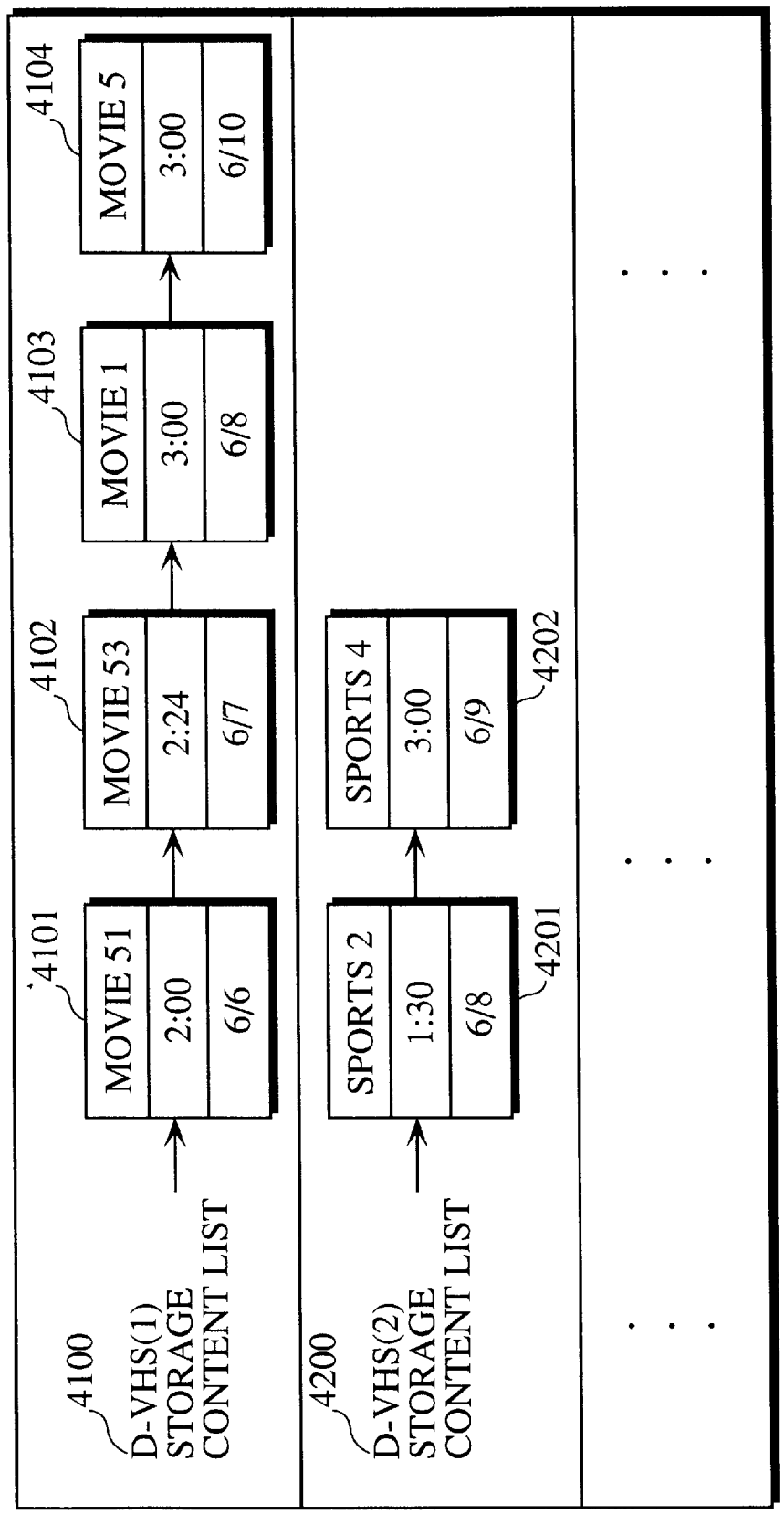
FIG. 14 is a diagram showing an example of a device classified storage content list.
Figure 15:
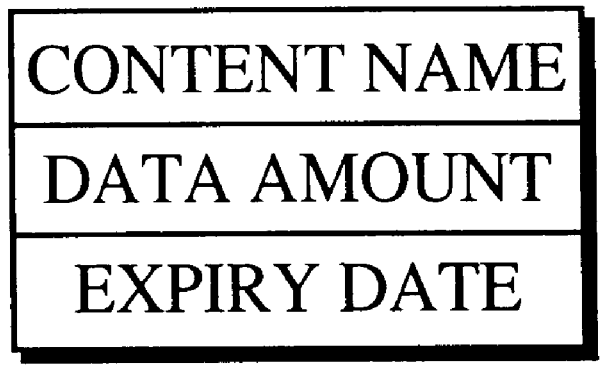
FIG. 15 shows a data structure of one element in the device classified storage content list.

FIG. 14 is a diagram showing an example of the device classified storage content list. FIG. 15 shows a data structure of one element in the device classified storage content list.

The device classified storage content list lists external devices that are capable of storing contents and are connected to the receiving apparatus 5100 via the 1394 cable. In the device classified content list, all the contents designated by the user are classified according to their storage target devices. Information relating to each designated content is set as one element, and the elements are connected with each other as a list. It can be said that the device classified storage content list is a set of storage content lists that each show storage content information for each external device. Note as one example, that the connection between elements in the storage content list is realized by a so-called pointer chain method.

As shown in FIG. 15, each element in the storage content list is made up of a content name, a data amount, and an expiry date.

As examples, FIG. 14 shows storage content lists 4100 and 4200 whose storage target devices are "D-VHS(1)" and "D-VHS(2)" respectively. In a storage content list for each external device, elements are connected sequentially in the order of expiry date.

As one example, in the storage content list 4100 for the device "D-VHS(1)", elements are sequentially connected in the order of: an element showing a content "MOVIE51" having an expiry date of June 6 and a data amount of 2 hours; an element showing a content "MOVIE53" having an expiry date of June 7 and a data amount of 2 hours and 24 minutes; an element showing a content "MOVIE1" having an expiry date of June 8 and a data amount of 3 hours; and an element showing a content "MOVIE5" having an expiry date of Jun. 10 and a data amount of 3 hours.

As another example, in the storage content list 4200 for the device "D-VHS (2)", elements are sequentially connected in the order of: an element showing a content "SPORTS2" having an expiry date of June 8 and a data amount of 1 hour and 30 minutes; and an element showing a content "SPORTS4" having an expiry date of June 9 and a data amount of 3 hours.

It should be noted that connecting an element showing a content to a storage content list is hereafter referred to as "registering the content into the storage content list".

2-3. Operations

The following explains an operation of the receiving system relating to the second embodiment. The explanation will be given only on a storage indication responsive process, a storage schedule cancel indication responsive process, and a storage process performed by the receiving apparatus 5100, which differ from those in the receiving system 1000 relating to the first embodiment.

2-3-1. Storage Indication Responsive Process

The receiving apparatus 5100 performs the storage indication responsive process when the user performs an operation for giving a storage indication and the input accepting unit 1160 accepts this indication.

Figure 16:
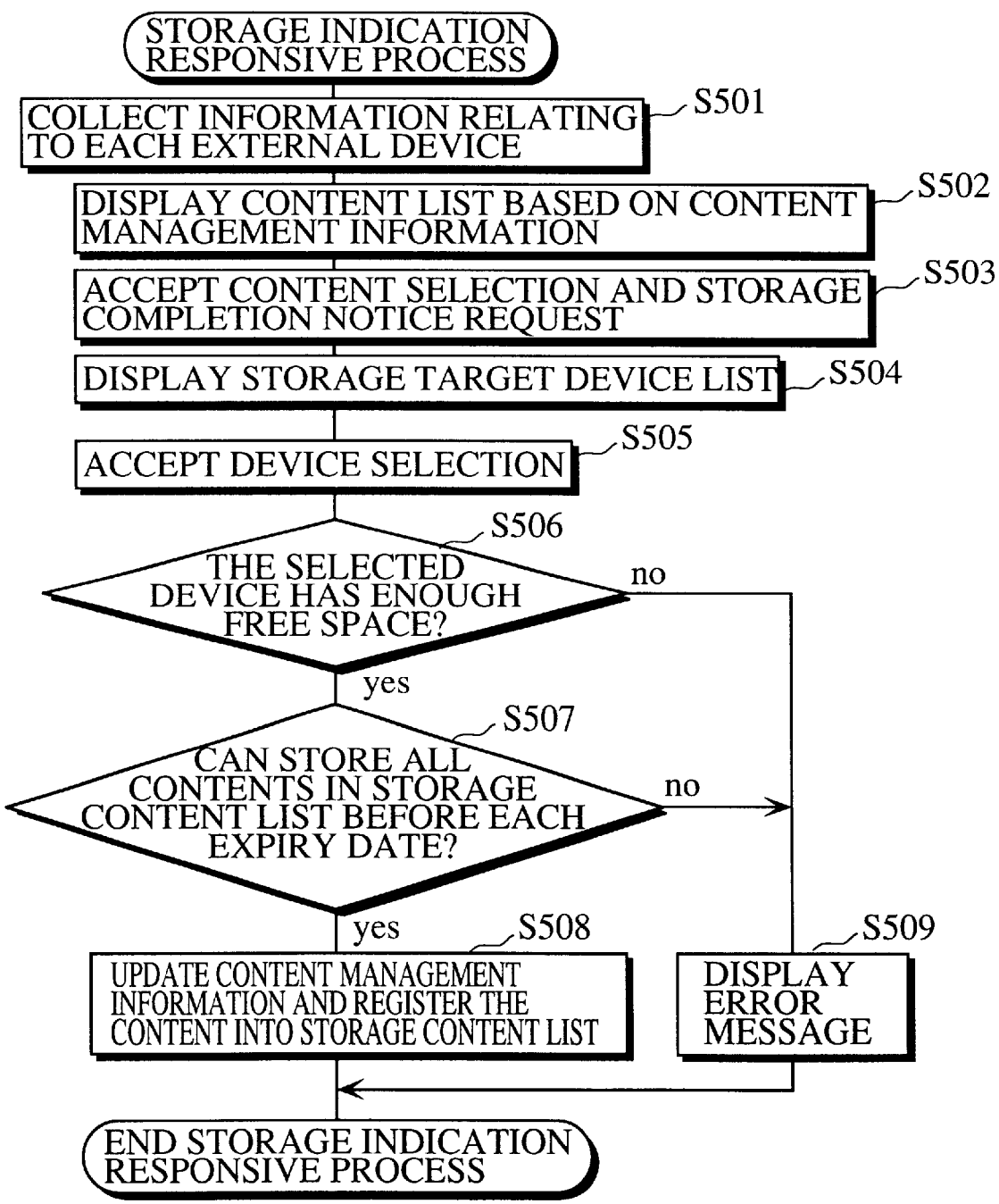
FIG. 16 is a flowchart showing a storage indication responsive process performed to schedule the storage process when the receiving apparatus 5100 receives a storage indication from the user.

FIG. 16 is a flowchart showing the storage indication responsive process performed to schedule the storage process when the receiving apparatus 5100 receives the storage indication from the user.

In the figure, steps S501 to S505 are the same as steps S101 to S105 shown in FIG. 6, and so detailed explanations are omitted here.

The control unit 5140 in the receiving apparatus 5100 collects information relating to each external device connected to the receiving apparatus 5100 via the 1394 cable, by way of the communication unit 1180. The information relating to each external device includes a device name, device information, and information as to whether the external device is busy or not. The control unit 5140 then updates the device management information stored in the device management information storage unit 5142 (step S501). After collecting the information relating to each external device, the control unit 5140 generates, based on the content management information, a list of a content name, a date and time, a type, a genre, an amount, and an expiry date, of each content accumulated in the accumulation unit 1130, and displays the generated list via the information display unit 1150 (step S502). The control unit 5140 accepts a user designation of a content to be stored, and a user request of a storage completion notice when such a notice is necessary, via the input accepting unit 1160 (step S503).

After accepting such user designations, the control unit 5140 retrieves external devices that can be a storage target of the designated content according to a type of the designated content, by referring to the device management information. The control unit 5140 then displays a list of the retrieved external devices via the information display unit 1150 (step S504). The control unit 5140 then accepts a user designation of the external device as the storage target, via the input accepting unit 1160 (step S505).

After receiving the designation of the storage target device, the control unit 5140 judges whether a storage medium of the designated external device has an enough free space to store the designated content (step S506). To be more specific, the control unit 5140 refers to the content management information and the device management information and judges whether the storage target device has a free space at least corresponding to a total data amount of the designated content and other contents for which the storage processes have been scheduled.

If the control unit 5140 judges that the storage medium does not have an enough free space in step S506, the control unit 5140 displays an error message via the information display unit 1150 (step S509) and ends the storage indication responsive process.

If the control unit 5140 judges that the storage medium has an enough free space in step S506, the control unit 5140 calculates the time taken to store the designated content, by referring to such information as the data amount of the content and the speed at which the storage target device receives the transferred data and processes the data. The control unit 5140 then refers to the storage schedule information in the device management information to check whether the contents that are registered in the storage content list and the designated content can be stored respectively before their expiry dates (step S507).

If the control unit 5140 judges that either of these contents cannot be stored before its expiry date in step S507, the control unit 5140 displays an error message via the information display unit 1150 (step S509), and ends the storage indication responsive process.

If the control unit 5140 judges that each content can be stored before its expiry date in step S507, the control unit 5140 writes the external device designated by the user in the storage target field 2007, a value showing "NOT STORED" in the storage state field 2008, and "NECESSARY" or "UNNECESSARY" according to a user indication in the storage completion notice field 2009 in the content management information. The control unit 5140 also registers the designated content into the storage content list for the storage target device (step S508). This completes the storage indication responsive process. Note that the control unit 5140 rearranges elements in the order of expiry date when registering the designated content into the storage content list.

As described above, the storage process is scheduled for the content registered in the storage content list.

2-3-2. Storage Schedule Cancel Indication Responsive Process

The following explains a storage schedule cancel indication responsive process performed by the receiving apparatus 5100 when the user desires to cancel a storage schedule.

The storage schedule cancel indication responsive process performed by the receiving apparatus 5100 is basically the same as the storage schedule cancel indication responsive process performed by the receiving apparatus 1100 described in the first embodiment (see FIG. 9), with the only difference described as follows.

The storage schedule is cancelled in step S124 in the following way. Information relating to the selected content is deleted from the storage content list for an external device identified by a device name obtained by referring to the storage target field 2007 in the content management information 2000 associated with the selected content. The storage target field 2007 is then updated to a value showing "NONE".

Also, if the control unit 5140 judges that the selected content is partially stored in step S123, the control unit 5140 transmits a deletion command to an external device identified by a device name obtained by referring to the storage target field 2007 in the content management information 2000 (step S125) to cancel the storage schedule (step S124). The control unit 1140 then ends the storage schedule cancel indication responsive process. Here, a content name may be transmitted together with the deletion command as its parameter. In this case, each external device connected to the receiving apparatus 5100 may have the function of deleting the content indicated by the deletion command from the storage medium, that is, the function of clearing an area associated with the content indicated by the deletion command within the storage medium. If provided with such a function, the external device deletes the content.

2-3-3. Storage Process

Figure 17:
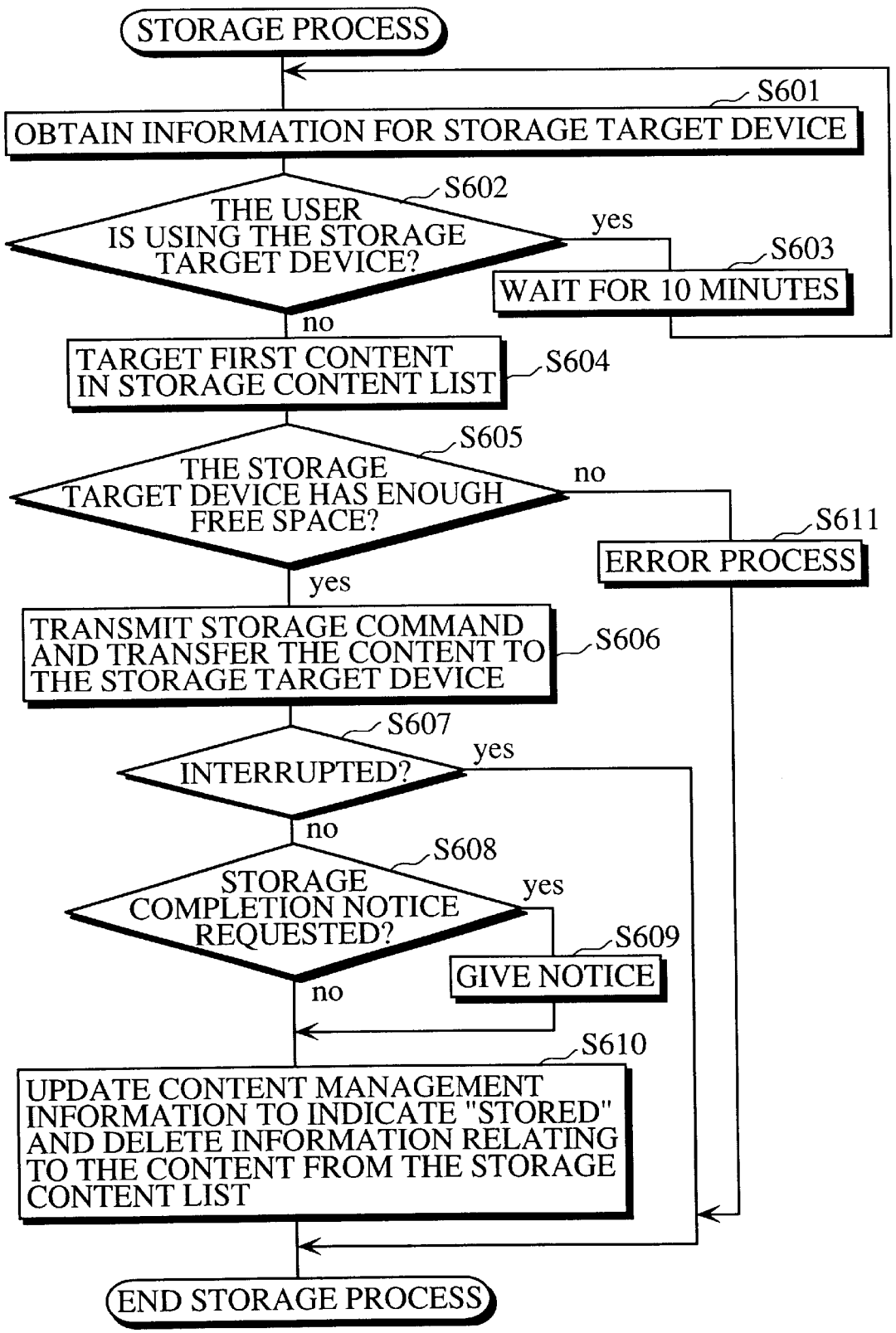
FIG. 17 is a flowchart showing a storage process performed by the receiving apparatus 5100.

FIG. 17 is a flowchart showing the storage process performed by the receiving apparatus 5100.

The storage process in the figure is preformed for each external device. Here, an explanation is given on one external device of a storage target.

The control unit 5140 in the receiving apparatus 5100 obtains information relating to a storage target device connected to the receiving apparatus 5100 via the 1394 cable for a content to be stored via the communication unit 1180. The control unit 5140 then updates the device management information stored in the device management information storage unit 5142 (step S601). This results in the device management information to reflect information relating to the current state of the storage target device, including information relating to a free space, or information as to whether the external device is busy or not.

After collecting information relating to the storage target device, the control unit 5140 judges whether the storage target device is busy or not (step S602). If this judgment result is positive, the control unit 5140 waits for ten minutes as one example (step S603), and the processing returns to step S601.

If the control unit 5140 judges that the user is not using the storage target device in step S602, the control unit 5140 targets the first content registered in the storage content list (step S604). The control unit 5140 judges whether the storage target device has an enough free space to store the targeted content, by referring to the device management information (step S605). Referring now to an example in FIG. 14 where the storage target device is "D-VHS(1)" with the storage content list shown therein, the control unit 5140 targets the content "MOVIE51" in step S604. Here, "targeting the content" indicates "making the content a processing target". To be more specific, as one example, the control unit 5140 updates pointer information that specifies a location of a target content, so as to show a location of the content targeted in step S604.

If the control unit 5140 judges that the storage target device does not have an enough free space in step S605, the control unit 5140 performs an error process such as notification of an error message (step S611), and ends the storage process.

If the control unit 5140 judges that the storage target device has an enough free space in step S605, the control unit 5140 transmits a storage command to the storage target device, and transfers the targeted content to the storage target device (step S606). Here, the storage command is the same as the storage command described in the first embodiment. Also, when transferring the targeted content, the control unit 5140 refers to the storage state field 2008 in the content management information. When the storage state filed 2008 shows that the targeted content is partially stored, a part of the targeted content that is a sequel to the already stored part is transferred.

After transmitting the storage command and transferring the content to the external device, the control unit 5140 judges whether the transfer of the content is interrupted or not (step S607). If the transfer of the content is judged to be interrupted, the control unit 5140 ends the storage process. Also, the control unit 5140 writes "PARTIALLY STORED" in the storage state field 2008 associated with the content in the content management information, together with information showing which part of the content is to be transferred subsequently.

If the control unit 5140 judges that the transfer of the content is not interrupted in step S607, the control unit 5140 judges whether a storage completion notice is requested, by referring to the storage completion notice field 2009 associated with the transferred content in the content management information (step S608).

If the control unit 5140 judges that the storage completion notice is requested in step S608, the control unit 5140 notifies the user of the storage completion by displaying a message to the effect that the content has been completely stored via the information display unit 1150. The message includes a content name of the stored content. Also, the control unit 5140 updates the storage completion notice field 2009 in the content management information to indicate that the notice has been already given (step S609).

If the control unit 5140 judges that the storage completion notice is not requested in step S608, or after the processing in step S609 has been executed, the control unit 5140 updates the storage state field 2008 in the content management information to indicate that the content has been stored, deletes the first element relating to the transferred content connected in the storage content list (step S610), and ends the storage process.

It should be noted that the receiving apparatus 5100 repeats the storage process from steps S601 through S610 on each external device whose storage content list shows at least one element connected therein.

3. Third Embodiment

The following explains a receiving system in an accumulation-type broadcast system relating to the third embodiment of the present invention, with reference to the drawings. The receiving system relating to the third embodiment has the same construction as the receiving system described in the first embodiment, with the only difference being in a part of the receiving apparatus. Accordingly, the present embodiment will be explained focusing on the receiving apparatus.

The receiving apparatus 1100 relating to the first embodiment displays a list of external devices that can be a storage target, and accepts a designation of a storage target device from the user (steps S104 and S105). On the other hand, the receiving apparatus relating to the third embodiment has the function of automatically determining a storage target device based on storage target device determining information designated in advance by the user. The storage target device determining information will be explained later.

Note that components of the receiving apparatus relating to the third embodiment that are the same as the components of the receiving apparatus 1100 relating to the first embodiment are not explained in detail in the present embodiment.

3-1. Construction

Figure 18:
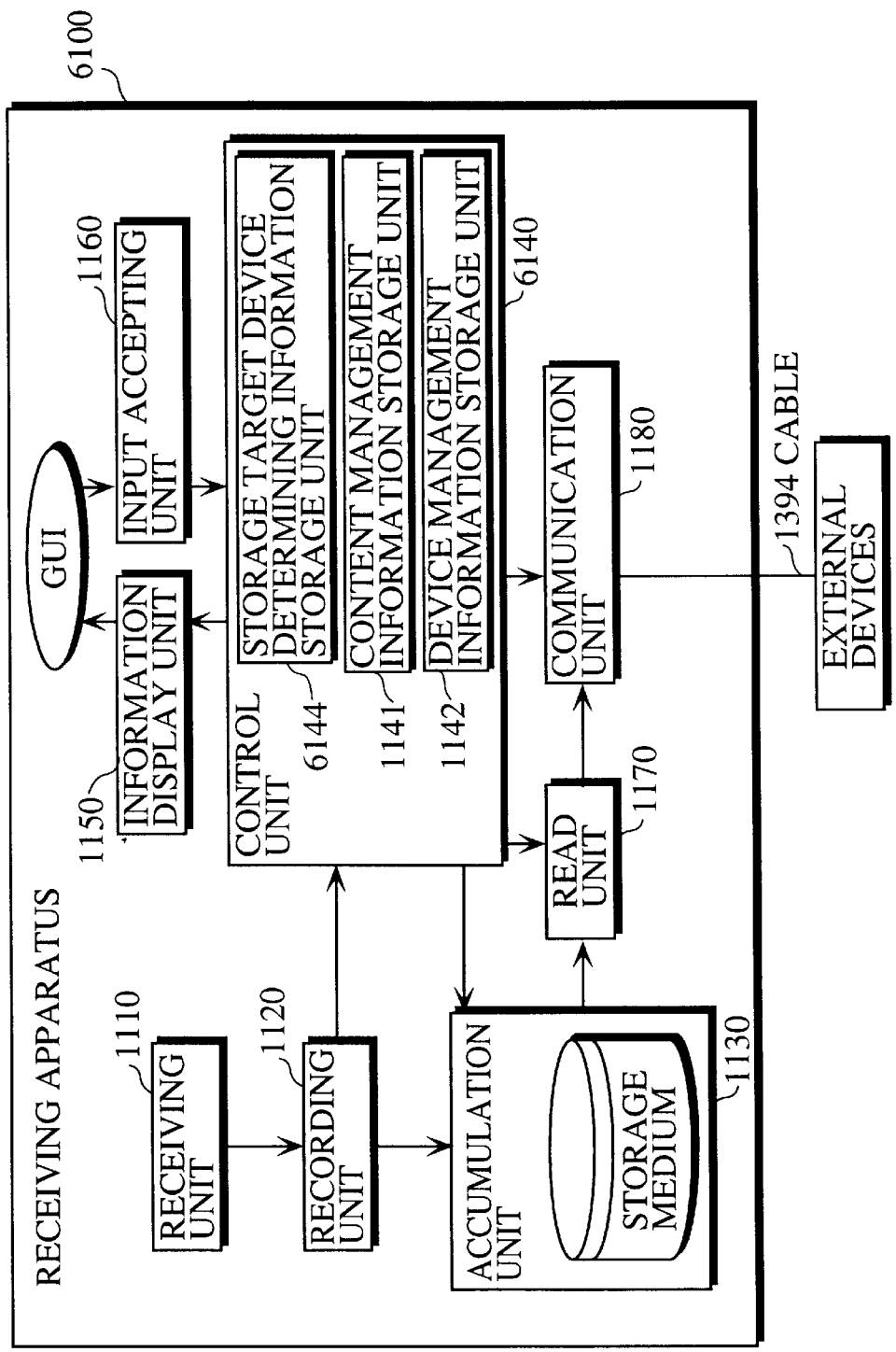
FIG. 18 is a functional block diagram of a receiving apparatus 6100 relating to a third embodiment of the present invention.

FIG. 18 is a functional block diagram of a receiving apparatus 6100 relating to the third embodiment of the present invention. In the figure, components that are the same as the components in FIG. 2 have been given the same reference numerals as before.

The receiving apparatus 6100 has the functions of receiving and accumulating broadcast contents, and controlling external devices connected to the receiving apparatus 6100 via the 1394 cable. The receiving apparatus 6100 functionally includes a receiving unit 1110, a recording unit 1120, an accumulation unit 1130, a control unit 6140, an information display unit 1150, an input accepting unit 1160, a read unit 1170, and a communication unit 1180. The receiving apparatus 6100 differs from the receiving apparatus 1100 relating to the first embodiment only in the control unit 6140.

Here, the control unit 6140 is constructed of a memory, a processor, and the like. The functions of the control unit 6140 to control each unit in the receiving apparatus 6100 are realized by the processor executing a control program stored in the memory. The control unit 6140 includes a storage target device determining information storage unit 6144, a content management information storage unit 1141, and a device management information storage unit 1142.

The storage target device determining information storage unit 6144 is a nonvolatile memory area for storing storage target device determining information used to determine an external device into which a content that has been accumulated in the accumulation unit 1130 is stored.

The control unit 6140 has the following functions. The control unit 6140 accepts a user designation of a content to be stored via the input accepting unit 1161, and controls the recording unit 1120. Also, the control unit 6140 collects device information relating to a name and a capability of each external device connected to the receiving apparatus 6100 via the 1394 cable, and updates the device management information. Moreover, the control unit 6140 obtains information relating to each content accumulated in the accumulation unit 1130 by the recording unit 1120, updates the content management information, and displays a list of the contents stored based on the content management information via the information display unit 1150. Also, the control unit 1140 accepts a user indication relating to a content to be stored, via the input accepting unit 1160, so as to perform control to store the content in accordance with this user indication. Furthermore, the control unit 6140 has the function of generating storage target device determining information necessary for determining a storage target device upon receipt of a user designation (this function is hereafter referred to as "storage target device registration function").

Also, the control unit 6140 deletes a content which is expired, that is to say, a content whose expiry date of one week after a date to which the start date and time belongs is passed, in a case where a free space in the accumulation unit 1130 becomes insufficient, like when 80% of its total capacity is occupied.

3-2. Data

The following explains the storage target device determining information stored in the storage target device determining information storage unit 6144.

FIG. 19 shows examples of structures and contents of the storage target device determining information.

As shown in the figure, storage target device determining information 7100 includes a "content type" field 7101 and a "device name" field 7102, and is a set of information associating a content type and device names. The control unit 6140 generates the storage target device determining information upon receipt of a user designation. As one example, a remote-controller is provided with a button showing "STORAGE TARGET DEVICE REGISTER" beforehand. When the user presses the button, the control unit 6140 accepts the user operation via the input accepting unit 1160. The control unit 6140 waits for a user designation of a pair of a content type and one or more device names, and generates the storage target device determining information based on the user designation.

Here, the content type field 7101 shows a type of a content, such that the content is "AUDIO AND VIDEO", "AUDIO", "STILL IMAGE", or "CHARACTER STRING". The type here indicates a data format of the content.

The device name field 7102 shows one or more external devices designated as a storage target by the user. When the device name field 7102 shows a plurality of external devices, it is assumed that the user prioritizes and designates these external devices.

Referring to examples shown in the figure, the devices "D-VHS(1)", "D-VHS(2)", and "AV-HDD" are associated with an "AUDIO AND VIDEO" content in said order. Also, the devices "AV-HDD", and "HDD" are associated with an "AUDIO" content in said order.

3-3. Operations

The following explains a storage indication responsive process, and a storage target device registration process that realizes the storage target device registration function performed by the receiving apparatus 6100, which differ from those in the receiving apparatus 1100 relating to the first embodiment.

3-3-1. Storage Target Device Registration Process

The receiving apparatus 6100 performs the storage target device registration process when the user performs an operation indicating to register a storage target device and the input accepting unit 1160 accepts this indication. The user operation may be pressing the button showing "STORAGE TARGET DEVICE REGISTER" equipped with a remote-controller.

Figure 20:
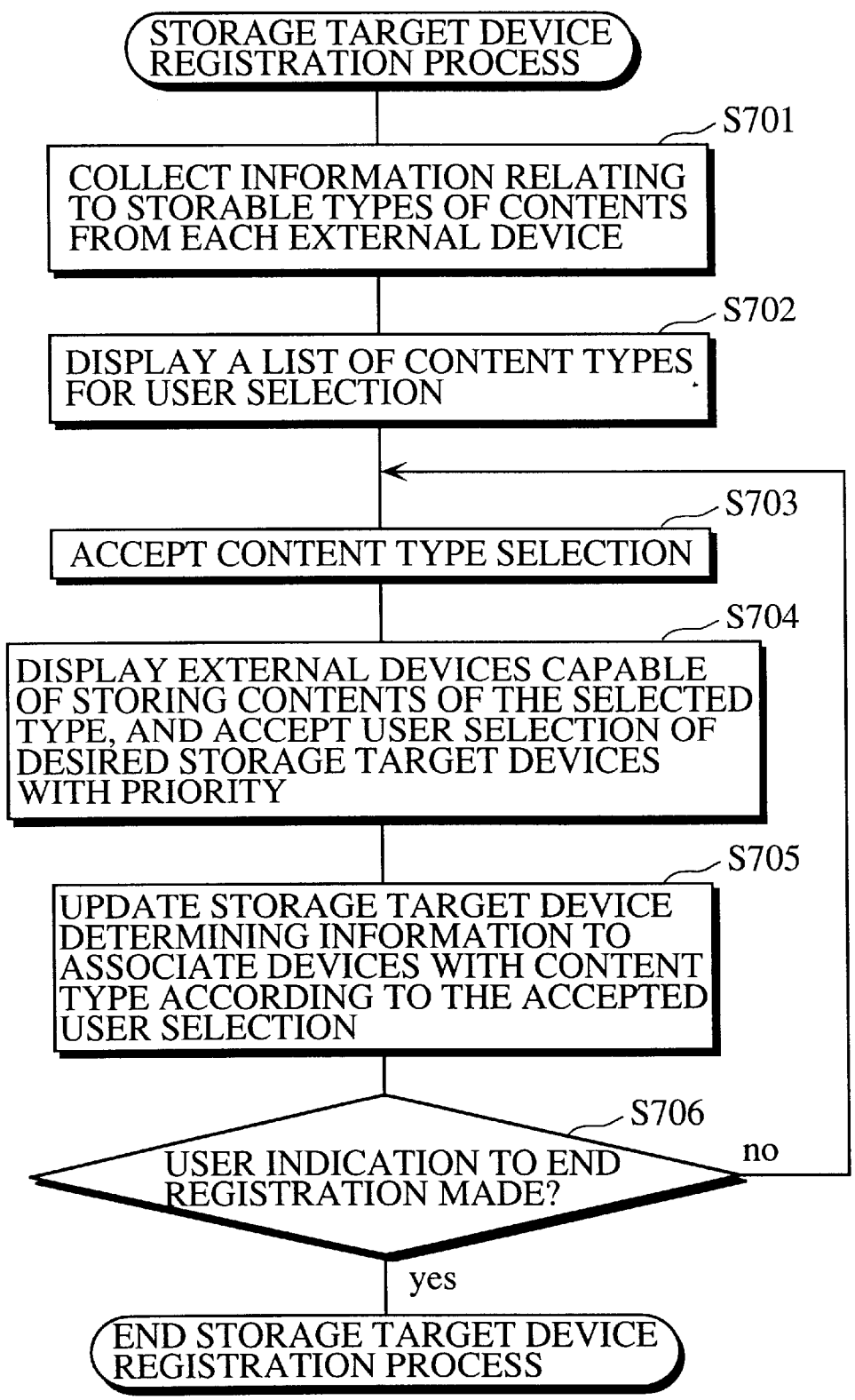
FIG. 20 is a flowchart showing a storage target device registration process performed when the receiving apparatus receives a user operation indicating to register a storage target device.

FIG. 20 is a flowchart showing the storage target device registration process performed when the receiving apparatus 6100 receives the user operation indicating to register a storage target device.

The control unit 6140 in the receiving apparatus 6100 first collects information relating to each external device connected to the receiving apparatus 6100 via the 1394 cable, by way of the communication unit 1180 (step S701). More specifically, the communication unit 1180 obtains a device name and device information by accessing a configuration ROM equipped in each external device. Note that the device information includes a type of a processable content of the external device, that is, a type of a content that can be stored in the external device.

The control unit 6140 then generates a list of all the content types obtained in step S701, and displays the generated list via the information display unit 1150 so that the user can select a content type (step S702). The control unit 6140 then accepts a user selection of a content type, via the input accepting unit 1160 (step S703).

After accepting the user selection of the content type, the control unit 6140 displays a list of all the external devices that are capable of storing contents of the selected content type via the information display unit 1150, based on the association of the device names and the content types obtained in step S701. Following this, the control unit 6140 accepts a user designation of all external devices that are desired to be a storage target, via the input accepting unit 1160 (step S704). When a plurality of external devices are designated by the user, the control unit 6140 also accepts the user priority of the external devices.

After accepting the user designation of the external devices, the control unit 6140 generates storage target device determining information by associating a content type and device names of the designated external devices, according to the accepted user designation. The control unit 6140 then stores the generated storage target device determining information into the storage target device determining information storage unit 6144 (step S705). When storage target device determining information has already been stored therein, the control unit 6140 instead updates the storage target device determining information in step S705.

The control unit 6140 repeats the processing from steps S703 through S705 until accepting an indication to end the registration from the user. Accepting the user indication to end the registration, the control unit 6140 ends the storage target device registration process (step S706).

After this storage target device registration process, such storage target device determining information as shown in FIG. 19 is stored in the storage target device determining information storage unit 6144.

Figure 21:
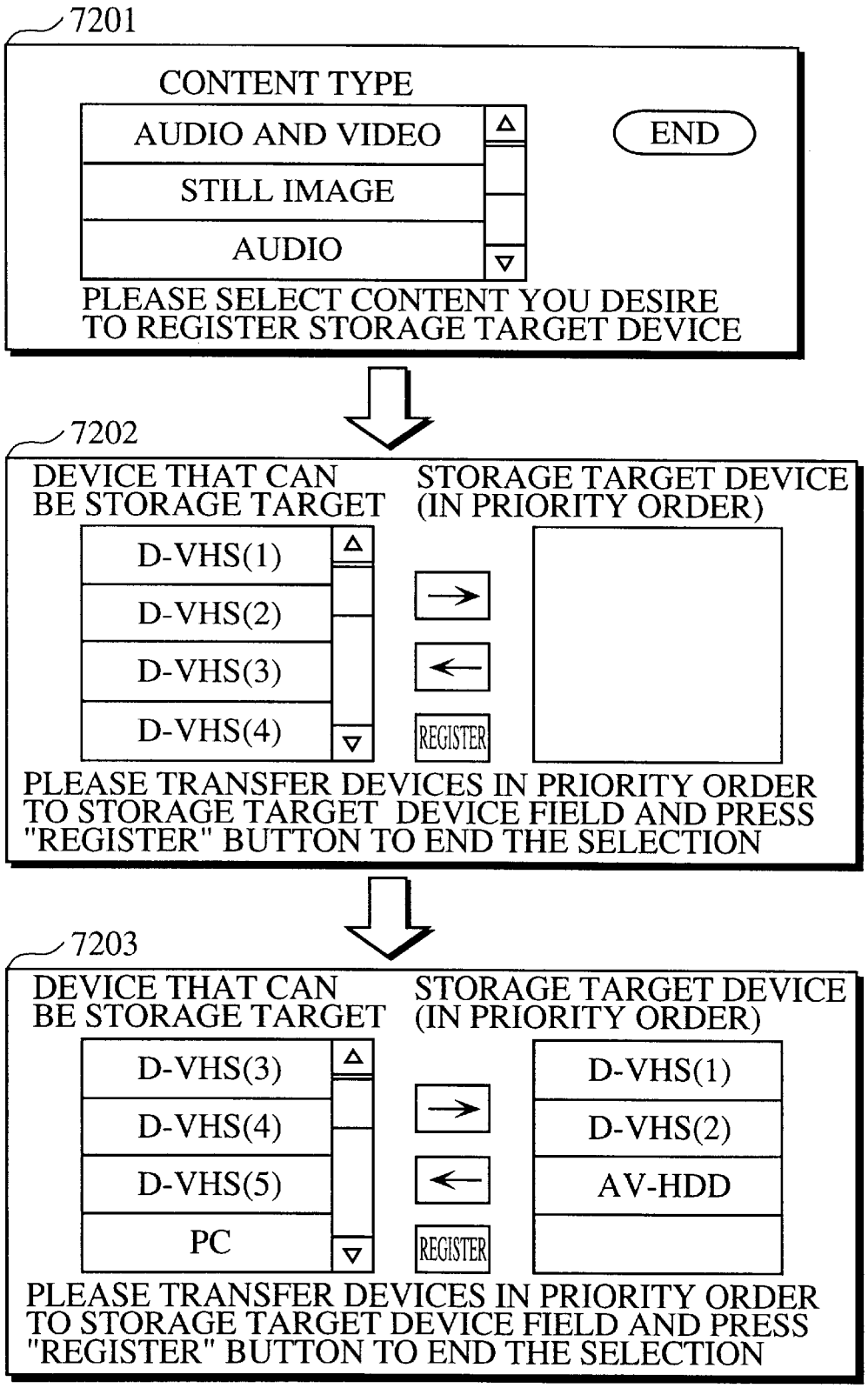
FIG. 21 shows display examples of the receiving apparatus 6100 when performing the storage target device registration process.

FIG. 21 shows display examples of the receiving apparatus 6100 when performing the storage target device registration process.

A display 7201 shows an example of a list of content types displayed in step S702. The user selects a content type for which he or she desires to register a storage target device.

A display 7202 is an example display in step S704 performed after the user selects an audio and video as a content type for which he or she desires to register a storage target device. The display 7202 shows a list of external devices that can be selected as a storage target for an audio and video content. In this example, it is assumed that the devices "D-VHS(1) to D-VHS(5)", "AV-HDD", "PC", and the like are connected to the receiving apparatus 6100.

The user repeats an operation to select one external device and press a button showing an arrow "→", so that storage target devices are designated in the order of priority.

A display 7203 shows a state where the user has designated the devices "D-VHS(1)", "D-VHS(2)", and "AV-HDD" in said order on the display 7202. The user can end the designation by pressing the button showing "REGISTER".

3-3-2. Storage Indication Responsive Process

The receiving apparatus 6100 performs the storage indication responsive process when the user performs an operation for giving a storage indication and the input accepting unit 1160 accepts this indication.

Figure 22:
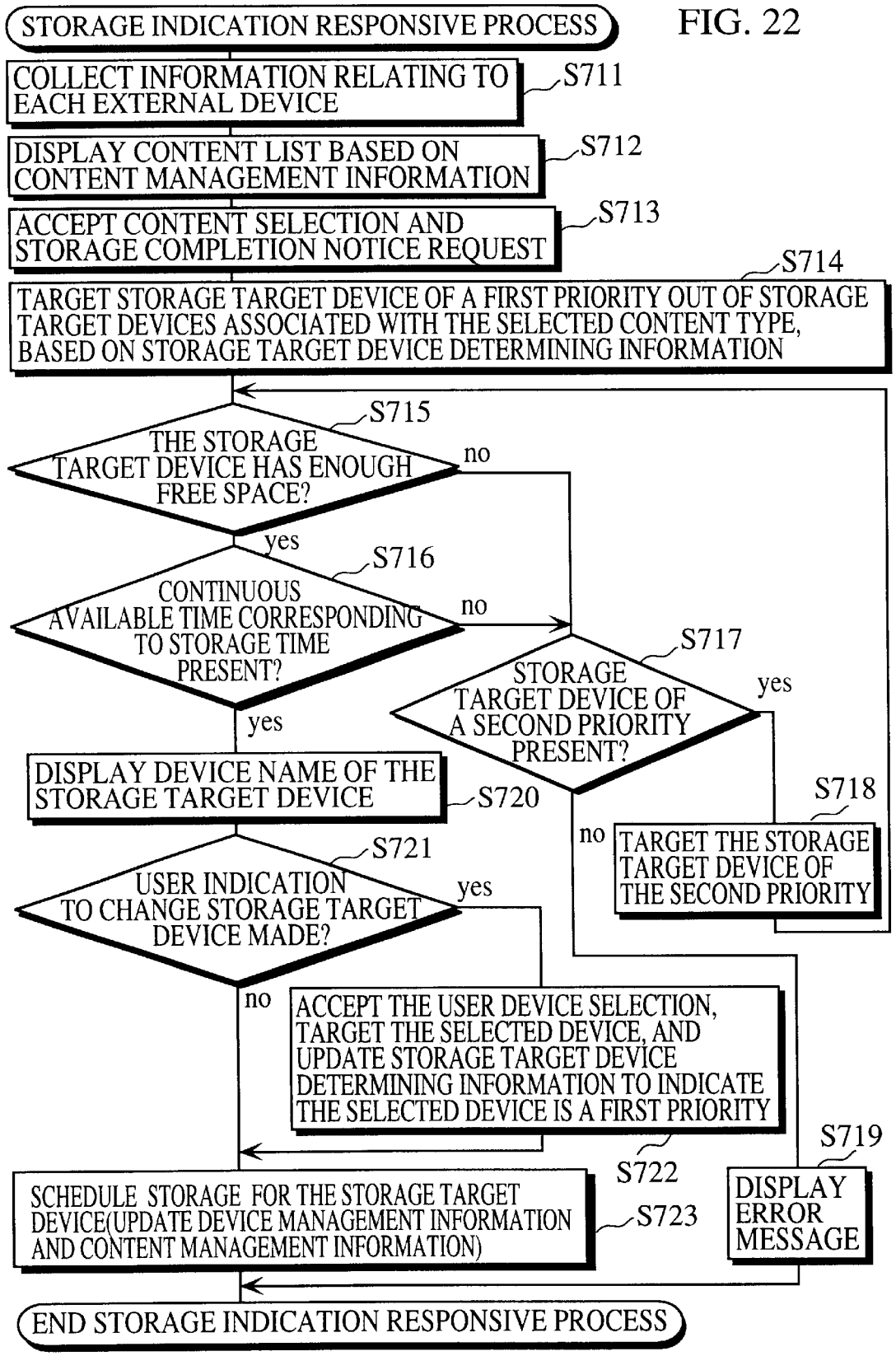
FIG. 22 is a flowchart showing the storage indication responsive process performed to schedule the storage process when the receiving apparatus 6100 receives a storage indication from the user.

FIG. 22 is a flowchart showing the storage indication responsive process performed to schedule the storage process when the receiving apparatus 6100 receives the storage indication from the user.

In the figure, steps S711 to S713, S715, S716, and S723 are respectively the same as steps S101 to S103, S106, S107, and S108 shown in FIG. 6, and so detailed explanations are omitted here.

The control unit 6140 in the receiving apparatus 6100 collects, upon receipt of a storage indication from the user, information relating to each external device connected to the receiving apparatus 6100 via the 1394 cable, by way of the communication unit 1180. The information relating to each external device includes a device name, device information, and information as to whether the external device is busy or not. The control unit 6140 then updates the device management information stored in the device management information storage unit 1142 (step S711). After collecting the information relating to each external device, the control unit 6140 generates, based on the content management information stored in the content management information storage unit 1141, a list of a content name, a date and time, a type, a genre, an amount, and an expiry date, of each content accumulated in the accumulation unit 1130, and displays the generated list via the information display unit 1150 (step S712). The control unit 6140 accepts a user designation of a content to be stored, and a user request of a storage completion notice when such a notice is necessary, via the input accepting unit 1160 (step S713).

After accepting such user designations, the control unit 6140 refers to the storage target device determining information (see FIG. 19) and targets an external device of a first priority, out of external devices associated with a content type of the designated content (step S714).

Following this, the control unit 6140 judges whether a storage medium of the targeted external device has an enough free space to store the designated content (step S715). If the control unit 6140 judges that the storage medium does not have an enough free space in step S715, the control unit 6140 refers to the storage target device determining information to see if there is an external device of a second priority (step S717). The control unit 6140 targets the external device of the second priority if the storage target device determining information includes such an external device (step S718). Following this, the control unit 6140 performs the judgment in step S715 on the targeted external device.

If the control unit 6140 judges that the storage medium has an enough free space in step S715, the control unit 6140 calculates the time taken to store the designated content, by referring to such information as the data amount of the content and the speed at which the targeted external device receives the transferred data and processes the data. The control unit 6140 then refers to the storage schedule information in the device management information to check whether there is a continuous available time period that corresponds to the time taken to store the content, before the expiry date of the content (step S716). Here, the continuous available time period means a time period during which no storage process is scheduled.

If the control unit 6140 judges that there is no continuous available time period that corresponds to the time taken to store the content, the control unit 6140 refers to the storage target device determining information to see if there is an external device of a third priority (step S717). The control unit 6140 targets the external device of the third priority if the storage target device determining information includes such an external device (step S718). Following this, the control unit 6140 performs the judgment in step S715 on the targeted external device.

If the control unit 6140 judges that there is no external device of the third/second priority in step S717, the control unit 6140 displays an error message via the information display unit 1150 (step S719), and ends the storage indication responsive process.

If the control unit 6140 judges that there is a continuous available time period that corresponds to the time taken to store the content in step S716, the control unit 6140 displays a device name of the targeted external device via the information display unit 1150 to notify the user of the storage target device (step S720).

Following this, when the control unit 6140 accepts a user indication to change the storage target device via the input accepting unit 1160 (step S721), the control unit 6140 accepts a user designation of another storage target device. The control unit 6140 targets the designated external device, and also, updates the storage target device determining information so that the designated external device is the first priority for the content type of the designated content (step S722). Note that the control unit 6140 may perform the same judgment as in steps S715 and S716 on the designated external device. In this case, the control unit 6140 displays an error message and ends the storage indication responsive process, when the external device is judged to lack in an enough free space or a required available time period.

If the user does not give an indication to change the storage target device in step S721, namely, if the user operates to indicate an acceptance of the device name displayed in step S720, or if the processing in step S722 is performed, the control unit 6140 schedules to store the content in the targeted external device and ends the storage indication responsive process (step S723).

FIG. 23 shows display examples of the receiving apparatus 6100 for the user to make various designations relating to storage of a content. In the figure, the display 3001 and the display 3002 are the same as the displays of the receiving apparatus 1100.

A display 7301 is an example display in step S720, and is displayed after an audio and video content of a sports program named "SPORTS2" is designated to be stored by the user. It is assumed that the device "D-VHS(1)" that is the first priority, out of the external devices that can be a storage target for an audio and video content shown in FIG. 19, does not have an enough free space to store the designated content.

When the user presses the button showing "CHANGE STORAGE TARGET" on the display 7301, the control unit 6140 starts the processing in step S722, and performs a display for the user to freely designate a storage target device, and accept a user designation of a storage target device.

The above described construction dispenses the user with the labor of designating a storage target device every time he or she designates a content to be stored, simply by making the receiving apparatus 6100 perform the storage target device registration process in advance. This enables the user to designate the content to be stored more easily.

3-4. Modifications

The receiving apparatus 6100 performs the storage target device registration process for registering a storage target device of a content in association with a type of the content beforehand, and the storage indication responsive process for determining a storage target device of a content designated by the user, out of the registered external devices, based on a type of the content and scheduling storage of the content in the storage target device. However, in addition to the type of the content, a genre of the content may also be referred to for determining a storage target device suitable for the genre of the content. The receiving apparatus 6100 modified to determine the storage target device according to the genre of the content is hereafter referred to as a "modified receiving apparatus 6100".

The modified receiving apparatus 6100 is basically constructed of the same components as the receiving apparatus 6100 (see FIG. 18), except that the storage target device determining information storage unit 6144 includes a genre classified storage target determining information in addition to the storage target device determining information.

FIG. 24 shows examples of structures and contents of the genre classified storage target device determining information.

As shown in the figure, genre classified storage target device determining information 7500 includes a "genre" field 7501 and a "device name" field 7502, and is a set of information associating a genre and device names. The control unit 6140 generates the genre classified storage target device determining information together with the storage target device determining information, upon receipt of a user designation.

In the modified receiving apparatus 6100, in the storage target device registration process, genres, such as movie, sports, news, and music, are displayed as a list in addition to the content types shown in the display 7201 in FIG. 21 so that the user can select a genre. When the user designates a genre, the control unit 6140 also accepts a user designation of prioritized storage target devices for a content of the designated genre. Based on the user designation, the control unit generates the genre classified storage target determining information shown in FIG. 24. Note that the modified receiving apparatus 6100 prestores genre information relating to varieties of genres so that it can display a list of genres.

Also, in the modified receiving apparatus 6100, in the storage indication responsive process, if a genre of a content designated by the user is registered in the genre classified storage target device determining information, the control unit 6140 targets external devices associated with the genre in the order of priority (steps S714 to S718). If the genre of the designated content is not registered in the genre classified storage target device determining information, the control unit 6140 targets external devices associated with a type of the content in the order of priority, based on the storage target device determining information (steps S714 to S718).

The above described construction dispenses the user with the labor of designating a storage target device every time he or she designates a content to be stored, simply by making the modified receiving apparatus 6100 perform the storage target device registration process in advance. This enables contents to be stored into storage target devices with being classified in genres.

4. Fourth Embodiment

The following explains a receiving system in an accumulation-type broadcast system relating to the fourth embodiment of the present invention, with reference to the drawings. The receiving system relating to the fourth embodiment has the same construction as the receiving system described in the third embodiment, with the only difference being in the receiving apparatus. Accordingly, the present embodiment will be explained focusing on the receiving apparatus.

The receiving apparatus relating to the fourth embodiment has the function of restricting a copy of a content, in addition to the functions of the receiving apparatus 6100 described in the third embodiment.

4-1. Copy Restrictive Information

It is assumed that each content is made up of a main data part, and an accessory data part, that is, a header part. The main data part includes information such as a movie, music, and the accessory data part includes information such as an offering date and time.

There has conventionally been various copy restrictive information, however, the present embodiment assumes that the copy restrictive information indicates values showing either of "NO RESTRICTION", "ONE-COPY ONLY", "TRANSFER ONLY", and "DO NOT COPY".

Here, "NO RESTRICTION" indicates that both copy and transfer of a content are permitted without any restriction. "ONE-COPY ONLY" indicates that only one copy of a content can be made and thereafter the copy of the content is prohibited. "TRANSFER ONLY" indicates that a content cannot be copied in a state where it retains at the original location, but the content can be copied in a state where it is not available at the original location, meaning that the content can only be transferred. "DO NOT COPY" indicates that neither copy nor transfer of a content is permitted.

4-2. Construction

FIG. 25 is a functional block diagram of a receiving apparatus 8100 relating to the fourth embodiment of the present invention. In the figure, components that are the same as the components in FIG. 18 have been given the same reference numerals as before.

The receiving apparatus 8100 has the functions of receiving and accumulating broadcast contents, and controlling external devices connected to the receiving apparatus 8100 via the 1394 cable. The receiving apparatus 8100 functionally includes a receiving unit 1110, a recording unit 1120, an accumulation unit 1130, a control unit 8140, an information display unit 1150, an input accepting unit 1160, a read unit 1170, a communication unit 1180, and an authentication unit 8190. The receiving apparatus 8100 differs from the receiving apparatus 6100 relating to the third embodiment only in the control unit 8140 and the authentication unit 8190.

Here, the control unit 8140 is constructed of a memory, a processor, and the like. The functions of the control unit 8140 to control each unit in the receiving apparatus 8100 are realized by the processor executing a control program stored in the memory. The control unit 8140 includes a storage target device determining information storage unit 6144, a content management information storage unit 8141, and a device management information storage unit 1142.

The content management information storage unit 8141 includes content management information having the same fields as the content management information 2000 described in the first to third embodiments (see FIG. 4) and additionally having a "copy restrictive information" field, and is a memory area for storing the content management information.

Also, the control unit 8140 has the same functions as the control unit 6140 in the third embodiment with the only difference in the function of performing control to store a content. The control unit 8140 performs control to store a content in accordance with the above described copy restrictive information. To be more specific, the control unit 8140 controls the authentication unit 8190 to judge whether each external device connected to the receiving apparatus 8100 via the 1394 cable has the function of performing copy restriction of a content based on the copy restrictive information (this function is hereafter referred to as a "copy restrictive function").

The authentication unit 8190 communicates with each external device connected to the receiving apparatus 8100, via the communication unit 1180 with a conventional mutual authentication technique, and notifies the control unit 8140 whether the external device has the copy restrictive function. As one example, the authentication unit 8190 is constructed of a CPU and a memory storing an authentication program.

4-3. Data

The following explains the content management information stored in the content management information storage unit 8141.

FIG. 26 shows examples of data structures and contents of the content management information 8300 in the content management information storage unit 8141 stored by the control unit 8141.

The content management information 8300 is information relating to each content in the accumulation unit 1130 accumulated by the recording unit 1120. The content management information 8300 includes the same fields as the content management information 2000 shown in FIG. 4, and additionally includes a "copy restrictive information" field 8310. Note that some fields in the content management information 2000 are omitted in FIG. 26.

The control unit 8140 sets the copy restrictive information field 8310 by referring to a header part of each content. When a content is deleted from the accumulation unit 1130, the control unit 8140 also deletes information relating to the content in the content management information 8300.

4-4. Operations

The following explains a storage indication responsive process and a storage target device registration process preformed by the receiving apparatus 8100 relating to the fourth embodiment.

4-4-1. Storage Indication Responsive Process

The receiving apparatus 8100 performs the storage target device registration process when the user performs an operation indicating to register a storage target device and the input accepting unit 1160 accepts this indication.

Figure 27:
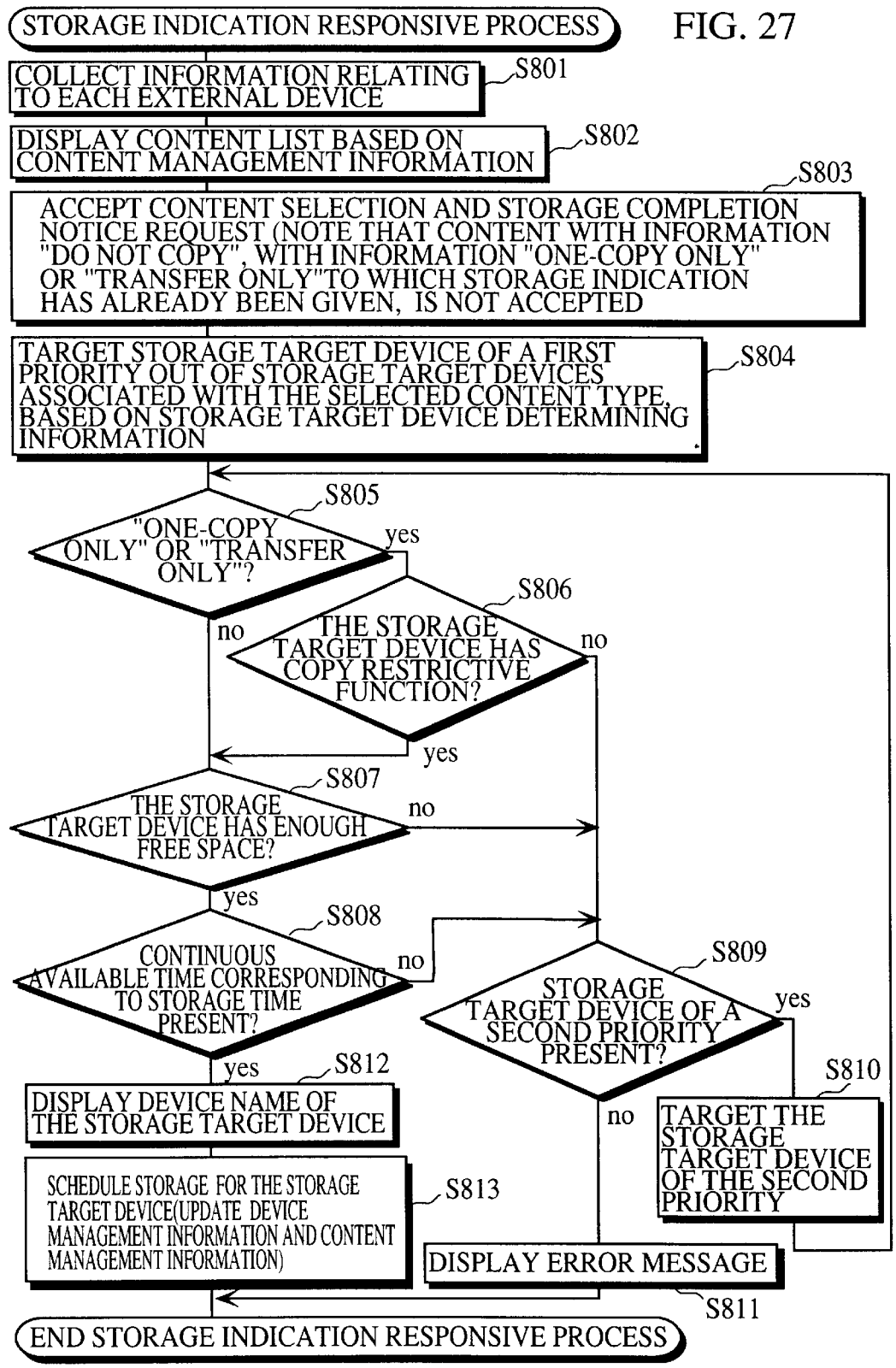
FIG. 27 is a flowchart showing a storage indication responsive process performed to schedule the storage process when the receiving apparatus 8100 receives a storage indication from the user.

FIG. 27 is a flowchart showing the storage indication responsive process performed to schedule the storage process when the receiving apparatus 8100 receives a storage indication from the user.

In the figure, steps S801, S804, S807 to S811, S812, and S813 are basically the same as steps S711, S712, S715 to S719, S720, and S723 described in FIG. 22 respectively, and so detailed explanations are omitted here. Note that steps S721 and S722 that correspond to a user indication to change a storage target device described in the third embodiment are not shown in FIG. 27 as they do not particularity relate to the features of the fourth embodiment.

The control unit 8140 in the receiving apparatus 8100 collects, upon receipt of a user indication to store a content, information relating to each external device connected to the receiving apparatus 8100 via the 1394 cable, by way of the communication unit 1180 (step S801). After collecting the information relating to each external device, the control unit 8140 generates, based on the content management information stored in the content management information storage unit 8141, a list of a content name, a date and time, a type, a genre, an amount, an expiry date, copy restrictive information, and the like, of each content accumulated in the accumulation unit 1130. The control unit 8140 then displays the generated list via the information display unit 1150 (step S802), and accepts a user designation of a content to be stored via the input accepting unit 1160. Also, the control unit 8140 accepts a storage completion notice request when such a notice is necessary (step S803).

In step S803, the control unit 8140 refers to the copy restrictive information field 8310 associated with the designated content. If the copy restrictive information field 8310 shows "DO NOT COPY", the control unit 8140 does not accept the user designation of the content, and waits for a user designation of another content. Also, in cases where the copy restrictive information field 8310 associated with the designed content shows "ONE-COPY ONLY" or shows "TRANSFER ONLY" when the storage schedule has already been made for the designated content, the control unit 8140 does not accept the user designation of the content, and waits for a user designation of another content.

Following step S803, the control unit 8140 targets an external device of a first priority, out of external devices associated with a content type of the designated content, based on the storage target device determining information (step S804) The control unit 8140 then judges whether the copy information field 8310 for the designated content shows either of "ONE-COPY ONLY" or "TRANSFER ONLY" (step S805).

If the judgment result in step S805 is positive, the control unit 8140 judges whether the targeted external device has the copy restrictive function, by controlling the authentication unit 8190 to communicate with the external device for the authentication (step S806).

If the judgment result in step S805 is negative, or if the judgment result in step S806 is positive, the control unit 8140 judges whether the targeted external device has an enough free space to store the designated content (step S807). If the control unit 8140 judges that the targeted external device has an enough free space in step S807, the control unit 8140 calculates the time taken to store the designated content, by referring to such information as the data amount of the content and the speed at which the storage target device receives the transferred data and processes the data. The control unit 8140 then refers to the storage schedule information in the device management information to check if there is a continuous available time period that at least corresponds to the time taken to store the content, before the expiry date of the content (step S808).

If the judgment result in steps S806, S807, or S808 is negative, the control unit 8140 refers to the storage target device determining information to see if there is an external device of a second priority. If the storage target device determining information includes such an external device (step S809), the control unit 8140 targets the external device of the second priority (step S810), and performs the judgment in step S805 on the targeted external device.

If the control unit 8140 judges that there is no external device of the second priority in step S809, the control unit 8140 displays an error message (step S811), and ends the storage indication responsive process.

If the control unit 8140 judges that there is a continuous available time period that corresponds to the time taken to store the content in step S808, the control unit 8140 displays a device name of the targeted external device via the information display unit 1150 to notify the user of the storage target device (step S812), schedules storage of the content into the targeted external device, and ends the storage indication responsive process (step S813).

4-4-2. Storage Process

The storage process performed by the receiving apparatus 8100 is the same as the storage process described in FIG. 11, except that it additionally includes control relating to a copy restriction.

The control unit 8140 refers to copy restrictive information for a content to be stored. When the copy restrictive information indicates "ONE-COPY ONLY", the processing for updating the copy restrictive information in the header part of the content accumulated in the accumulation unit 1130 to "DO NOT COPY" is provided before step S205 where the content is transferred. When the copy restrictive information indicates "TRANSFER ONLY", the processing for deleting the content accumulated in the accumulation unit 1130 is provided after step S205 where the content is transferred.

For a content whose copy restrictive information in the content management information is updated to a value indicating "DO NOT COPY" in the above described way, the user is not able to perform a subsequent storage indication by the above described processing in step S803.

Note that the authentication unit 8190 may be controlled prior to step S205 where a content is transferred, so that the content can be transferred only when the storage target device has the copy restrictive function. Also, when the copy restrictive information of the content shows "ONE-COPY ONLY", the copy restrictive information in the header unit may not be updated to "DO NOT COPY", but the content maybe transferred to the storage target device. In this case, the storage target device updates the copy restrictive information to "DO NOT COPY" when recording the content.

5. Additional Explanations

Although the receiving apparatus of the present invention has been described based on the first to fourth embodiments, the invention should not be limited to such. For instance, the following modifications are possible.

(1) Although the above embodiments explain the receiving apparatus that receives and accumulates broadcast contents in the accumulation-type broadcast system, the present invention should not be limited to such an accumulation-type broadcast system in which the broadcasting apparatus broadcasts each content before the start date and time of the content. The present invention is also applicable to receiving apparatuses in broadcast systems of general TV broadcasts or radio broadcasts as examples, as long as the receiving apparatuses have the functions of receiving and temporarily accumulating contents in a storage medium and making the accumulated contents available to the user according to a user request to view or listen to the content.

Also, broadcasts received by the receiving apparatus may either be ground wave broadcasts, satellite broadcasts, or may be broadcasts made via telephone lines or broadcast cables.

(2) The receiving apparatus relating to the above embodiments displays a list of contents based on the content management information in the storage indication responsive process. However, the receiving apparatus may be provided with the function of displaying a list of the fields 2001 to 2009 in the content management information not when the storage indication is made but when the user requests the list display. The receiving apparatus may also be provided with the function of displaying a list of the fields 2001 to 2007 only for already stored contents in the content management information. For example, if the receiving apparatus 6100 described in the third embodiment is provided with such a display function, the user is always able to identify an external device into which a content is stored.

(3) In the above embodiments, each external device connected to the receiving apparatus via the 1394 cable includes device information in its configuration ROM. The device information includes information showing types of processable contents, that is, contents that can be stored in the external device. Alternatively, each external device may not include information showing types of processable contents but may only include information showing a device type in its configuration ROM. In this case, the receiving apparatus is made to include a device information table in which a device type of each external device is associated with types of processable contents. The receiving apparatus may obtain a device type from each external device upon resetting the bus or the like, and refer to the device information table to obtain types of processable contents of the external device. FIG. 28 is a diagram showing examples of structures and contents of a device information table stored by a receiving apparatus modified in this way.

(4) In the above embodiments, the receiving apparatus displays a list of contents received and accumulated in the accumulation unit, to let the user to designate a content to be stored. Alternatively, the receiving apparatus may display a list of contents that are not yet received but are scheduled to be broadcasted, using an EPG or the like, to let the user to designate a content to be stored. In such a case, the receiving apparatus schedules storage of the designated content so that it is transferred to an external device after the start date and time of the content.

Also, in a case where the receiving apparatus is able to accept a user designation of a content that is yet to be broadcasted to schedule storage of the designated content, the receiving apparatus may start storing the content, or start transferring the content, when the designated content is received and starts to be accumulated, or when the designated content is completely accumulated. For this purpose, the receiving apparatus 5100 in the second embodiment may be modified as follows.

Each element in the storage content list (FIG. 15) of the receiving apparatus 5100 may be provided with a storage start flag showing whether storing a content can be started or not.

In this case, the receiving apparatus 5100 sets, when a content that is yet to be broadcasted is designated by the user, the storage start flag of the content to show that storing the content cannot be started, and registers the storage start flag into the storage content list. Also, the receiving apparatus 5100 performs a storage process on a content whose storage start flag shows that storing the content can be started. The receiving apparatus changes the storage start flag to show a value showing that storing the content can be started, when the content is received and starts to be accumulated, or when the content is completely accumulated.

(5) In the above embodiments, the information display unit 1150 displays information on a liquid crystal display provided on the receiving apparatus. Alternatively, the information may be displayed on a display device such as a TV monitor connected to the receiving apparatus.

(6) In the above embodiments, the receiving apparatus collects information relating to each external device in the storage indication responsive process, but such information may instead be collected upon resetting the bus when a new external device is connected to the 1394 cable, or an external device is disconnected from the 1394 cable.

(7) In the above embodiments, an expiry date for each content, which serves as a standard for deleting the content, is uniformly set as a date one week after a date to which the start date and time of the content belongs. However, the expiry date may be made varied depending on genres or types of contents. As examples, the expiry date for a newspaper content may be set as a date following a date to which the start date and time of the content belongs, the expiry date for an audio and video content may be set as two weeks after a date to which the start date and time of the content belongs. Also, the expiry date may be set in accordance with a user indication, or may be set using a different method for each content.

Alternatively, the expiry date may not be specifically set. For example, the receiving apparatus may deletes contents accumulated in the storage medium one after another in the order of start date and time, when a free space in the storage medium is not more than 20%, to secure a free space of at least 20% of the total capacity of the storage medium. In this case, too, each content will be deleted in due course, after a predetermined time period. Here, the receiving apparatus may operate in the same way as described in the above embodiments except that the receiving apparatus does not perform judgments relating to the expiry date.

More specifically, the receiving apparatus may transfer a content designated by the user, out of the contents accumulated in the accumulation unit, to a storage target device while the storage target device is not busy. In the case where contents are deleted one after another in the order of start date and time, it is preferable to register each content into the storage content list described in the second embodiment not in the order of expiry date but in the order of start date and time.

Also, when deleting a content from the accumulation unit, the receiving apparatus may check whether the content designated by the user has already been stored, by referring to the content management information. If not, the receiving apparatus may display an error message and suppresses to accumulate a new content into the accumulation unit.

(8) Although the above embodiments describe the case where one external device can be designated as a storage target for each content, a plurality of external devices may be designated as storage target devices for the content. In such a case, a storage process of the content or registration of the content may be scheduled in each of the plurality of external devices independently.

(9) In the first and second embodiments, the receiving apparatus displays a list of external devices that can be a storage target of a content, according to a type of the content, so that the user can select a storage target device. However, a user interface for the receiving apparatus to accept a user designation of a content to be stored and its storage target device may take any form. Note when only one external device that can be a storage target of the content is connected to the receiving apparatus, the receiving apparatus does not need to accept a user designation of a storage target device, and so may regard the external device as a storage target. Also, the receiving apparatus may assume, upon accepting a user designation of a content type, that all contents of the designated type are designated. That is to say, the receiving apparatus may accept an indirect designation from the user, identify contents to be stored, and operate as if the receiving apparatus accepts a user designation of these contents.

(10) In the above embodiments, the judgment is performed as to whether the user is currently using a storage target device to see if the device is busy. As one example, however, a D-VHS may be judged to be busy when the D-VHS is performing a record operation based on a record schedule by the user. That is to say, the receiving apparatus may collect information relating to a storage target device, and judge whether the device is in a state capable of storing a content, that is, in a state capable of accepting transfer of the content. Only when the above judgment result is positive, the content may be transferred to the device.

Also, external devices may transmit time information of their storage schedules corresponding to information collection of the receiving apparatus. In this case, the receiving apparatus may set storage schedule information in the device management information, or schedule storage of a content, in such a manner that a storage target device performs the storage process of the content designated by the user at the time other than the time shown by the transmitted time information.

In the above embodiments, when the user is using the storage target device at the initially scheduled time, the control unit schedules a storage process again at time at least one hour later in step S206 whereas the control unit waits for ten minutes in step S603. These time periods are set as examples, and may be set otherwise freely.

(11) In step S107 in the first embodiment, and in step S507 in the second embodiment, the time taken to store the content is calculated. This calculation may also be performed based on available bandwidth.

For example, data of a maximum of 400 Mbps can be transferred between external devices connected via the 1394 cable. According to IEEE1394 standard, an isochronous resource manager that manages bandwidth operates on one of the external devices. Therefore, the control unit in the receiving apparatus also inquires of the isochronous resource manager about an availability of the current bandwidth of the 1394 cable to obtain information about available bandwidth when obtaining information relating to each external device. This available bandwidth information may be referred to in the calculation of the time taken to store the content, or in determining bandwidth used to transfer the content. The receiving apparatus collects information relating to the device including information showing such a capability. This enables the receiving apparatus to determine the transfer speed, that is, the bandwidth used to transfer the content in accordance with the state of the available bandwidth, in a case where a storage target device is capable of transferring the content at various speeds, such as at 4× speed or 8× speed. For example, when the available bandwidth is wide, the content is transferred at high speed, and when the available bandwidth is narrow, the content is transferred at low speed.

Also, the first embodiment describes the case where the start and end time of the storage process for each content to be stored is written to the storage schedule information field in the device management information, to perform a storage schedule. In addition to this, bandwidth used to transfer the content may be written to the storage schedule information field in the device management information. In this case, the receiving apparatus is required to schedule a new storage process at an available time period of the external device, where the bandwidth enough to transfer the content is available.

Here, when determining the bandwidth used to transfer the content, the receiving apparatus notifies the isochronous resource manager of the bandwidth information using an asynchronous rock transaction specified by IEEE1394. This provides the receiving apparatus with a right to use a network resource such as the bandwidth to transfer the content.

(12) In the case where a content is divided into parts and a storage process is performed on each part as described in the first embodiment, the content may be divided in predetermined units, if any. These units are determined due to its data organization.

(13) The processing in step S202 in the first embodiment may be performed five minutes before the start time of the storage process as one example. If the storage target device is judged to be busy in reference to the device management information as a result of the processing in step S202, the user may be notified that the time to transfer the content for storage is approaching.

(14) External devices connected to the receiving apparatus are not limited to the external devices listed in the above embodiments, such as "D-VHS" or "MD". Also, they are not necessarily connected based on IEEE1394. Any external device is applicable as long as it is capable of accepting a content to be stored and an instruction to store the content from the receiving apparatus, and writing the transferred content into a certain medium upon receipt of the storage instruction. The external device may not be provided with a user interface. For example, when a content is a still image such as a newspaper, an external device to be a storage target of the content may be a printer that prints the received content.

Also, the storage medium for accumulating contents received by the receiving apparatus may not be physically embedded in the receiving apparatus. It may be an exteriortype hard disc, or the like. Furthermore, a user interface part of the receiving apparatus may be equipped in each external device connected to the receiving apparatus, and each external device equipped with the user interface part may transmit and receive information to/from the receiving apparatus via the communication unit. For example, the external device may transmit a message or the like to a TV connected to the receiving apparatus via the communication unit so that the TV can display the message, instead of displaying the message via the information display unit.

Also, the external device may be provided with a mechanism that corresponds to the control unit having the functions of performing the storage indication responsive process and the storage process, and having a storage area for storing data such as the device management information required in these processes. In such a case, the receiving apparatus transfers the content, upon receipt of an indication from the external device provided with the mechanism.

(15) In the second embodiment, elements relating to contents are connected with each other in the storage content list in the order of expiry date. The order should not be limited to such. The elements may be connected in the order of reception of each content, or in the order of storage designation of each content. Also, content types may be prioritized beforehand, and the control unit may determine the order of the elements according to the priority. To store each content before its expiry date, however, the the order of expiry date is suitable.

(16) In the second embodiment, each element in the storage content list is made up of a content name, a data amount, and an expiry date. However, each element may not necessarily include such information, as long as each element includes information that identifies a content.

(17) Although the third embodiment does not explain a method for dividing a content into parts and scheduling a storage process of each part, the receiving apparatus in the third embodiment may also be provided with this method described in the first embodiment. In this case, an external device of a first priority may be determined as a storage target, selected out of external devices that each have an enough free space to store the content and can process a content type of the content, so that a storage schedule can be made in the external device.

Also, the third embodiment describes the receiving apparatus 6100 which has the same functions as the receiving apparatus 1100 described in the first embodiment, to which the function of enabling the user to register external devices to be a storage target of each type of a content is added. The receiving apparatus 5100 in the second embodiment may also be provided with such a function that is added to the receiving apparatus 6100.

Also, the storage target device determining information may be information associating each content type not with a plurality of external devices but with a single external device. In such a case, the receiving apparatus described in the first and second embodiments simply regards an external device associated with a content type of a content to be stored as a storage target device, without requiring the user to select a storage target device.

(18) In the third embodiment, when the user designates another external device to change a storage target device automatically determined by the receiving apparatus 6100 when the user designates a content to be stored, the storage target device determining information is updated so that the designated external device is a first priority as a storage target device for a content type of the designated content (step S722). Alternatively, however, the storage target device determining information may not be updated in step S722.

(19) The receiving apparatus 8100 in the fourth embodiment may perform so-called accounting control when making a copy of a specific content, such as a content whose header part includes information indicating to charge utility fee. More specifically, when storing a content according to a user indication, the receiving apparatus 8100 may be made to transmit information relating to utility fee to a computer in a content utility fee management institution or the like, via telephone lines or the like. The information relating to the utility fee may include a copy creation count and user identification information inputted in advance by the user.

(20) The present invention may be realized by a computer-readable storage medium, such as an IC (Integrated Circuit) card, an optical disc, a flexible disc, and a ROM (Read Only Memory), on which a control program (a computer program) that makes a receiving apparatus having the function of receiving and accumulating broadcasts in a storage medium execute the procedures of the receiving apparatus in the receiving system described in the above embodiments (including the procedures described in FIGS. 6, 9, 11, 16, 17, 20, 22, and 27). The computer program that achieves the present invention may also be transmitted and distributed via various communication networks. The distributed computer program may be utilized when installed in a receiving apparatus having the functions of receiving and accumulating broadcasts in a storage medium and executing programs. The procedures described above may be realized by the receiving apparatus executing the computer program.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A receiving apparatus that receives and accumulates broadcast contents into a storage medium to make each content available to a user, comprising:

a first storage medium;

receiving/accumulating means for receiving and accumulating the contents into the first storage medium;

deleting means for deleting each content accumulated in the first storage medium;

designation accepting means for accepting a designation of a content from the user;

transfer arranging means for
(a) judging whether transfer of the designated content from the first storage medium to a second storage medium before deletion of the designated content is possible, and
(b) arranging the transfer of the designated content when judging that the transfer is possible, wherein the second storage medium is included in an external device that is connected to the receiving apparatus and that can be used by the user;

device information obtaining means for obtaining device state information from the external device, the device state information showing whether the external device is in a content-storable state, the content-storable state at least including a state where the external device is not being used by the user; and transferring means for transferring, when the device state information shows that the external device is in the content-storable state, the designated content from the first storage medium to the second storage medium before the designated content is deleted, as arranged by the transfer arranging means.

2. The receiving apparatus of claim 1, further comprising interruption accepting means for accepting an interruption indication from the external device, the interruption indication showing that the transfer of the designated content is to be suspended,
wherein when the interruption accepting means accepts the interruption indication, the transferring means suspends the transfer, and resumes the transfer once the external device is back in the content-storable state.

3. The receiving apparatus of claim 1,
wherein the transfer arranging means schedules the transfer of the designated content by setting a time when the designated content is to be transferred, in such a manner that the time does not overlap any time set for a content of a preceding designation accepted by the designation accepting means, and
the transferring means transfers the designated content at the time set by the transfer arranging means.

4. The receiving apparatus of claim 3,
wherein the time set by the transfer arranging means is a start time and an end time of the transfer,
the transfer arranging means
   (a) sets the time so that the designated content can be transferred, based on a data amount of the designated content, and
   (b) divides the content into a plurality of parts and sets a start time and an end time of transfer of each part, when unable to set the time without overlapping the time set for the content of the preceding designation, and
the transfer means transfers each part during a time period between the start time and the end time set for the part.

5. The receiving apparatus of claim 3,
wherein when the external device is not in the content-storable state at the time set for the designated content by the transfer arranging means, the transferring means instructs the transfer arranging means to set the time again.

6. The receiving apparatus of claim 1, further comprising expiry determining means for determining an expiry date and time for each content accumulated in the first storage medium, the expiry date and time being a criterion for deleting the content,
wherein the deleting means deletes each content accumulated in the first storage medium after the expiry date determined for the content is passed,
the transfer arranging means arranges, when a user designation of a plurality of contents, out of the accumulated contents in the first storage medium, is accepted by the designation accepting means, transfer of the designated contents so that the designated contents are transferred in an order of the expiry date determined by the expiry determining means, and
the transferring means transfers the designated contents in the order arranged by the transfer arranging means.

7. The receiving apparatus of claim 1, wherein
the receiving apparatus is connected to a plurality of external devices,
the designation accepting means further accepts a designation of one of the external devices from the user,
the device information obtaining means obtains the device state information from the designated external device, and
the transferring means transfers the designated content from the first storage medium to the second storage medium included in the designated external device, when the designated external device is in the content-storable state, by referring to the obtained device state information.

8. The receiving apparatus of claim 1, wherein
the receiving apparatus is connected to a plurality of external devices, the receiving apparatus further comprising:
   device determining information storage means for storing device determining information associating a data format of a content and external devices that are capable of processing the content of the data format; and
   storage target device determining means for determining an external device that is associated with a data format of the designated content as a storage target device, by referring to the device determining information,
   wherein the device information obtaining means obtains the device state information from the external device that is determined as the storage target device, and
   the transferring means transfers the designated content from the first storage medium to the second storage medium included in the external device, when the external device that is determined as the storage target device is in the content-storable state, by referring to the obtained device state information.

9. The receiving apparatus of claim 8, wherein
the device determining information associates the data format of the content with the external devices, each external device being accompanied by a priority rating, and
the storage target device determining means
   (a) judges whether the second storage medium included in each of the external devices has a free space enough to store the designated content, in an order of the priority rating included in the device determining information, and
   (b) determines an external device with the highest priority rating as the storage target device, out of the external devices that are judged to have the free space enough to store the designated content.

10. The receiving apparatus of claim 1, wherein
the receiving apparatus is connected to a plurality of external devices, the receiving apparatus further comprising:
   device determining information storage means for storing device determining information associating a genre of a content and external devices that are capable of processing the content of the genre, the genre showing a category of an entity of the content; and
   storage target device determining means for determining an external device that is associated with a genre of the designated content as a storage target device, by referring to the device determining information,
   wherein the device information obtaining means obtains the device state information from the external device that is determined as the storage target device, and
   the transferring means transfers the designated content from the first storage medium to the second storage medium included in the external device, when the external device that is determined as the storage target device is in the content-storable state, by referring to the obtained device state information.

11. The receiving apparatus of claim 1, wherein the transferring means determines bandwidth used to transfer the designated content, by referring to external device information, the external device information showing a capability of the external device to which the designated content is to be transferred, and transfers the designated content using the bandwidth.

12. The receiving apparatus of claim 1, further comprising notification means for notifying the user of a completion of the transfer when the arranged transfer of the designated content is completed.

13. The receiving apparatus of claim 1, wherein when the designated content is yet to be received by the receiving/accumulating means, the transfer arranging means arranges to start the transfer of the designated content from the first storage medium to the second storage medium as soon as the receiving/accumulating means receives and accumulates the designated content in the first storage medium.

14. A receiving apparatus that receives and accumulates broadcast contents into a storage medium to make each content available to a user, comprising:
    receiving/accumulating means for receiving and accumulating the contents into a first storage medium;
    deleting means for deleting each content accumulated in the first storage medium;
    designation accepting means for accepting a designation of a content from the user;
    transfer arranging means for
        (a) judging whether transfer of the designated content from the first storage medium to a second storage medium before deletion of the designated content is possible, and
        (b) arranging the transfer of the designated content when judging that the transfer is possible; and
    transferring means for transferring the designated content from the first storage medium to the second storage medium before the designated content is deleted, as arranged by the transfer arranging means, wherein
    the designation accepting means does not accept a user designation of a content that includes copy prohibition information indicating to prohibit a copy of the content, and accepts a designation of a content which does not include the copy prohibition information.

15. The receiving apparatus of claim 14, further comprising
    the first storage medium,
    wherein the second storage medium is included in an external device that is connected to the receiving apparatus and that can be used by the user, and
    the transfer arranging means
        (a) judges whether the external device has a function relating to a copy restriction when the designated content includes copy restriction information indicating to restrict a copy of the content, and
        (b) arranges the transfer of the designated content from the first storage medium to the second storage medium included in the external device only when judging that the external device has the function relating to the copy restriction.

16. A content storage method for use in a receiving apparatus that receives and accumulates broadcast contents into a first storage medium to make each content available to a user, the content storage method comprising:
    a deleting step for deleting each content accumulated in the first storage medium;
    a designation accepting step for accepting a designation of a content from the user;
    a transfer arranging step for (a) judging whether transfer of the designated content from the first storage medium to a second storage medium before deletion of the designated content is possible, and (b) arranging the transfer of the designated content when judging that the transfer is possible,
    wherein the second storage medium is included in an external device that is connected to the receiving apparatus and that can be used by the user;
    a device information obtaining step for obtaining device state information from the external device, the device state information showing whether the external device is in a content-storable state, the content-storable state at least including a state where the external device is not being used by the user; and
    a transferring step for transferring, when the device state information shows that the external device is in the content-storable state, the designated content from the first storage medium to the second storage medium before the designated content is deleted, as arranged in the transfer arranging step.

17. A content storage method for use in a receiving apparatus that receives and accumulates broadcast contents into a first storage medium to make each content available to a user, the content storage method comprising:
    a deleting step for deleting each content accumulated in the first storage medium;
    a designation accepting step for accepting a designation of a content from the user;
    a transfer arranging step for (a) judging whether transfer of the designated content from the first storage medium to a second storage medium before deletion of the designated content is possible, and (b) arranging the transfer of the designated content when judging that the transfer is possible; and
    a transferring step for transferring the designated content from the first storage medium to the second storage medium before the designated content is deleted, as arranged in the transfer arranging step,
    wherein in the designation accepting step, a user designation of a content that includes copy prohibition information indicating to prohibit a copy of the content is not accepted, and a designation of a content which does not include the copy prohibition information is accepted.

18. A control program for making a receiving apparatus perform a content storage process, the receiving apparatus receiving and accumulating broadcast contents into a first storage medium to make each content available to a user and including a central processing unit, the control program comprising:
    a deleting step for deleting each content accumulated in the first storage medium;
    a designation accepting step for accepting a designation of a content from the user;
    a transfer arranging step for (a) judging whether transfer of the designated content from the first storage medium to a second storage medium before deletion of the designated content is possible, and (b) arranging the transfer of the designated content when judging that the transfer is possible, wherein the second storage medium is included in an external device that is connected to the receiving apparatus and that can be used by the user;

a device information obtaining step for obtaining device state information from the external device, the device state information showing whether the external device is in a content-storable state, the content-storable state at least including a state where the external device is not being used by the user; and a transferring step for transferring, when the device state information shows that the external device is in the content-storable state, the designated content from the first storage medium to the second storage medium before the designated content is deleted, as arranged in the transfer arranging step.

19. A control program for making a receiving apparatus perform a content storage process, the receiving apparatus receiving and accumulating broadcast contents into a first storage medium to make each content available to a user and including a central processing unit, the control program comprising:

a deleting step for deleting each content accumulated in the first storage medium;

a designation accepting step for accepting a designation of a content from the user;

a transfer arranging step for (a) judging whether transfer of the designated content from the first storage medium to a second storage medium before deletion of the designated content is possible, and (b) arranging the transfer of the designated content when judging that the transfer is possible; and a transferring step for transferring the designated content from the first storage medium to the second storage medium before the designated content is deleted, as arranged in the transfer arranging step, wherein in the designation accepting step, a user designation of a content that includes copy prohibition information indicating to prohibit a copy of the content is not accepted, and a designation of a content which does not include the copy prohibition information is accepted.

20. A receiving apparatus that receives and accumulates broadcast contents into a storage medium to make each content available to a user, comprising:

a first storage medium;

a receiving/accumulating unit operable to receive and accumulate the contents into the first storage medium;

a deleting unit operable to delete each content accumulated in the first storage medium;

a designation accepting unit operable to accept a designation of a content from the user;

a transfer arranging unit operable to (a) judge whether transfer of the designated content from the first storage medium to a second storage medium before deletion of the designated content is possible, and (b) arrange the transfer of the designated content when judging that the transfer is possible, wherein the second storage medium is included in an external device that is connected to the receiving apparatus and that can be used by the user;

a device information obtaining unit operable to obtain device state information from the external device, the device state information showing whether the external device is in a content-storable state, the content-storable state at least including a state where the external device is not being used by the user; and a transferring unit operable to transfer, when the device state information shows that the external device is in the content-storable state, the designated content from the first storage medium to the second storage medium before the designated content is deleted, as arranged by the transfer arranging unit.

21. A receiving apparatus that receives and accumulates broadcast contents into a storage medium to make each content available to a user, comprising:

a receiving/accumulating unit operable to receive and accumulate the contents into a first storage medium;

a deleting unit operable to delete each content accumulated in the first storage medium;

a designation accepting unit operable to accept a designation of a content from the user;

a transfer arranging unit operable to (a) judge whether transfer of the designated content from the first storage medium to a second storage medium before deletion of the designated content is possible, and (b) arrange the transfer of the designated content when judging that the transfer is possible; and a transferring unit operable to transfer the designated content from the first storage medium to the second storage medium before the designated content is deleted, as arranged by the transfer arranging unit, wherein the designation accepting unit does not accept a user designation of a content that includes copy prohibition information indicating to prohibit a copy of the content, and accepts a designation of a content which does not include the copy prohibition information.

* * * * *

UNITED STATES PATENT AND TRADEMARK OFFICE
CERTIFICATE OF CORRECTION

PATENT NO. : 6,636,953 B2
DATED : October 21, 2003
INVENTOR(S) : Aki Yuasa et al.

It is certified that error appears in the above-identified patent and that said Letters Patent is hereby corrected as shown below:

<u>Title page,</u>
Item [73], Assignee, should read as follows:
-- Assignee:    Matsushita Electric Industrial Co., Ltd., Osaka fu (JP) --.

Signed and Sealed this

Twenty-seventh Day of January, 2004

JON W. DUDAS
*Acting Director of the United States Patent and Trademark Office*